United States Patent [19]

Stauffer

[11] 4,002,899
[45] Jan. 11, 1977

[54] FOCUS DETECTING APPARATUS

[75] Inventor: Norman L. Stauffer, Englewood, Colo.

[73] Assignee: Honeywell Inc., Minneapolis, Minn.

[22] Filed: Oct. 31, 1975

[21] Appl. No.: 627,607

Related U.S. Application Data

[63] Continuation of Ser. No. 529,573, Dec. 4, 1974, abandoned, which is a continuation-in-part of Ser. No. 377,809, July 9, 1973, abandoned.

[52] U.S. Cl. .................. 250/201; 250/204; 250/209; 354/25
[51] Int. Cl.² ........................................ G01J 1/20
[58] Field of Search .......... 250/201, 204, 208, 209, 250/233–236, 578; 356/125, 126, 4; 354/25, 145, 163; 353/101

[56] References Cited
UNITED STATES PATENTS

| | | | |
|---|---|---|---|
| 3,450,883 | 6/1969 | Thomas | 250/204 |
| 3,493,764 | 2/1970 | Craig | 353/101 |
| 3,610,934 | 10/1971 | Turner | 250/201 |
| 3,684,374 | 8/1972 | Humphrey | 356/4 |
| 3,844,658 | 10/1974 | Gela et al. | 354/163 |

*Primary Examiner*—David C. Nelms
*Attorney, Agent, or Firm*—Henry L. Hanson; Charles J. Ungemach; David R. Fairbairn

[57] ABSTRACT

A focus detecting system includes first and second auxiliary optical devices for forming first and second auxiliary images of an object on first and second detector devices, respectively, which in some illustrated embodiments are closely disposed on a single substrate. Each detector device includes a plurality of linearly displaced light responsive elements, each element in the first detector device having a corresponding element in the second detector device in relatively the same position with respect to the detector devices. One of the optical devices moves with respect to its associated detector device to shift the light distribution pattern of the corresponding auxiliary image in the direction of the linear displacement of the light responsive elements. The moving optical device is so coupled to a moving objective lens, which focusses a principal image of the object on a light sensitive film, that when the principal image is in focus, equal amounts of light will fall on corresponding light responsive elements of the first and second detector devices. A signal processing circuit is connected to the light responsive elements to provide an output signal indicative of the relative identity of illumination intensity between corresponding light responsive elements, and therefore also indicative of the degree of focus of the principal image. This output signal is used to place the moving optical device and objective lens at the positions which give the best positional correspondence of the auxiliary image light distribution patterns on the detector devices, and hence the best focus of the principal image on the film.

44 Claims, 21 Drawing Figures

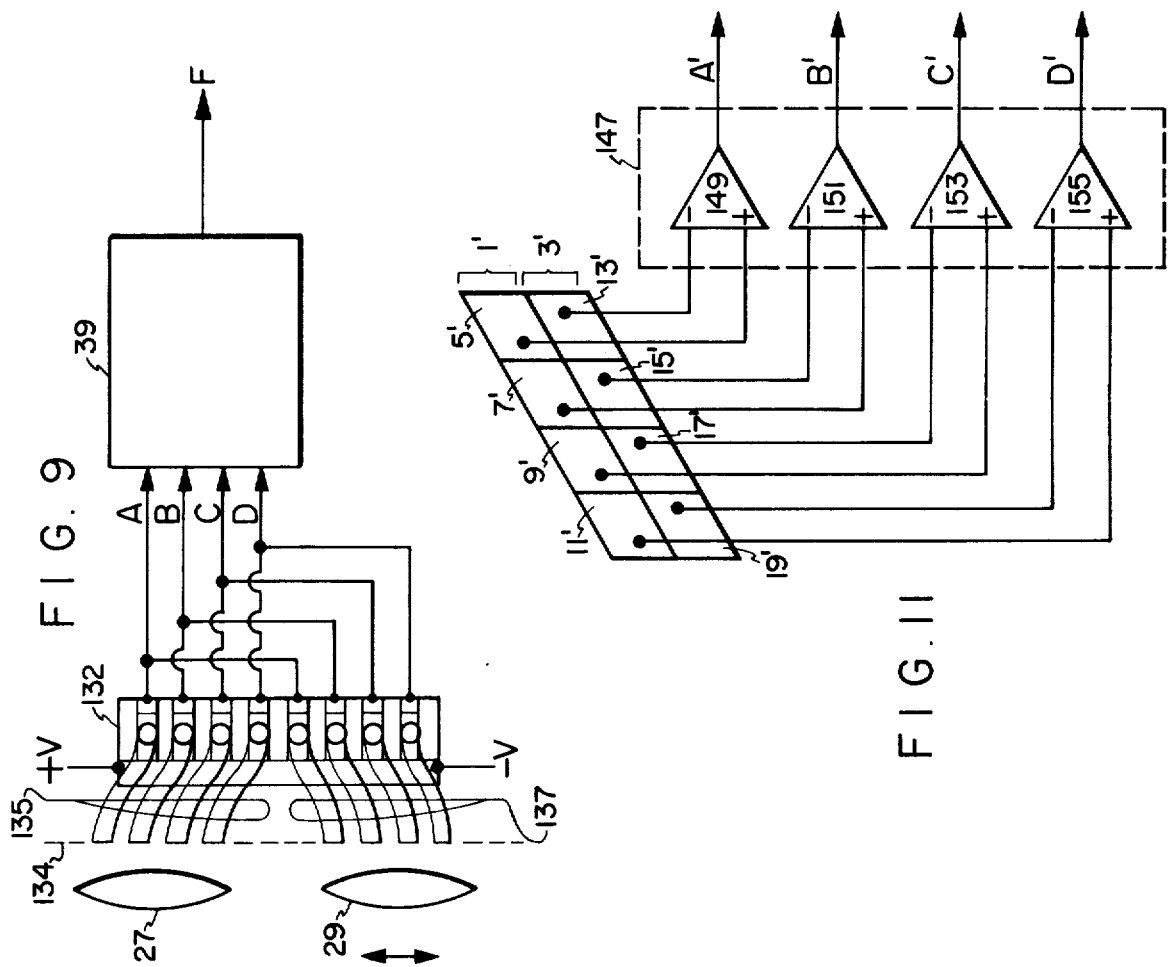
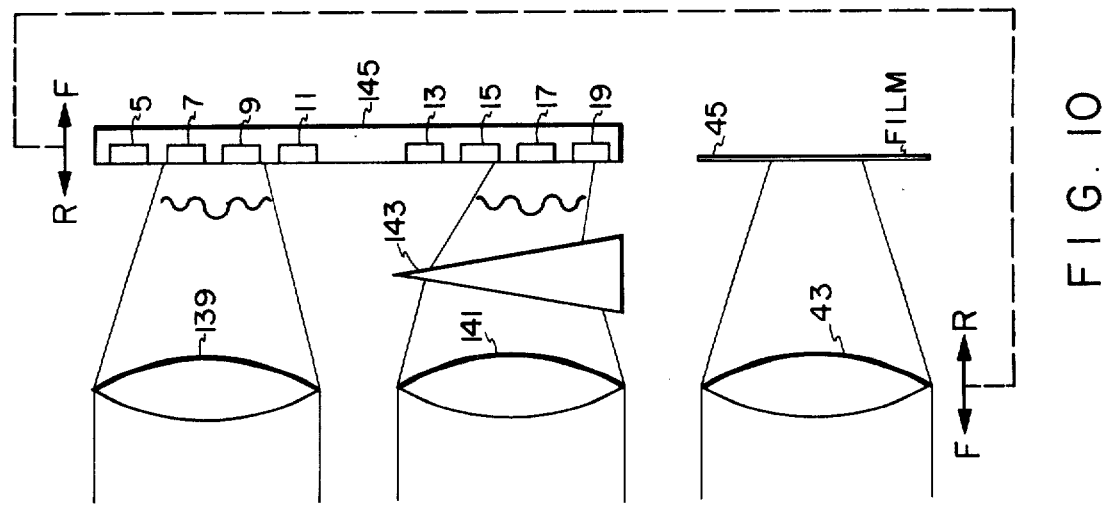

POSITION OF LENS 43
ALONG ITS DISTANCE SCALE

FOCUS DETECTING APPARATUS

CROSS REFERENCE TO RELATED APPLICATIONS

This is a continuation of application Ser. No. 529,573, filed Dec. 4, 1974 abandoned, which is a continuation-in-part of application Ser. No. 377,809, filed July 9, 1973 now abandoned.

BACKGROUND OF THE INVENTION

The present invention relates to optical systems. More specifically, it relates to automatic focus systems for automatically focussing an image of an object on a predetermined image plane.

There have been numerous efforts made in the past to provide means whereby a camera, either a still camera or a motion picture camera, may be made to focus automatically on the object which is being photographed. These have included means for evaluating the contrast of focussed and non-focussed images, means for measuring the angle of one or more beams of light projected from the camera to the object, means for analyzing the frequency components of an image as a function of focus, means for comparing the positions or the distribution of the light patterns of auxiliary images on separate, spaced single or multi-element light detectors, and mechanical or electromechanical means such as a pendulum actuated system. For one reason or another, none of the foregoing systems has provided to be entirely satisfactory for use in modern, relatively small, hand-held cameras.

For example, in those systems which provide means for evaluating the contrast components of the image, it is required that the analysis images achieve an exact focus in synchronism with exact focus of the principal image. If auxiliary lenses are used to provide the analysis images, these must be matched to the focal characteristics of the main lens. The same holds for systems which evaluate the frequency components of the analysis images. Those systems comparing the positions or the distribution of the light patterns of auxiliary images have exhibited deficiencies due to a lack of the necessary uniformity of the characteristics of the elements of their separate light detectors, particularly over a period of time, and due to a lack of adequate circuitry for processing the detector signals. These systems have also inherently been of such size as to require that the cameras containing them be unduly large. Those devices employing one or more light beams directed to the object, and those using a pendulum to effect automatic focus, require complex mechanical linkages.

SUMMARY OF THE INVENTION

It is, accordingly, an object of the present invention to provide an improved automatic focus system for cameras.

It is another object of the present invention to provide an improved automatic focus system as set forth which obviates the shortcomings of the prior art systems.

It is a further object of the present invention to provide an improved automatic focus system as set forth which is simple in structure and operation, and desirably compact.

It is yet another object of the present invention to provide an improved camera with an automatic focussing system.

In accomplishing these and other objects, there has been provided, in accordance with the present invention, an improved automatic focussing system wherein means are provided for producing a pair of auxiliary or detection images on a pair of multi-element detector means or arrays. The latter are so arranged that the distribution of the light patterns, or the radiation or light distributions, of the two images are sensed and compared. Further means are provided which respond to this comparison of the two images to produce a control signal. The control signal, in turn, is used to control a servo system for adjusting the position, and hence the light distribution, of one of the images with respect to its corresponding detector. The movement of the image is coordinated with a focussing means which concurrently varies for focus of a principal image such that an identity of the light distributions relative to the corresponding detector means coincides with an optimum focus of the principal image. To the end of obviating the shortcomings of the prior art systems, all of the elements of the detector means are advantageously formed on a single planar substrate, which may well be that of an integrated circuit chip. These elements are divided into two similar coplanar arrays, lying immediately adjacent each other, to form the two detector means, and the elements of each detector means are advantageously closely spaced along a line or path of that means. Further means are provided to cause the two images to be formed on the respective detector means notwithstanding the close spacing thereof. Additionally, the means which produces the said control signal may well include signal clamping, signal ratioing, and/or other signal handling circuitry to assure the accurate, consistant, and dependable operation of the apparatus under varying light level and other conditions.

BRIEF DESCRIPTION OF THE DRAWINGS

A better understanding of the present invention may be had from the following detailed description when read in connection with the accompanying drawings, in which:

FIG. 9 is a schematic diagram illustrating a modification to the embodiment shown in FIG. 1;

FIG. 10 is a schematic diagram illustrating another modification to the embodiment shown in FIG. 1;

FIG. 11 is a schematic diagram illustrating still another modification to the embodiment shown in FIG. 1;

DESCRIPTION OF THE PREFERRED EMBODIMENTS

Figure 1:
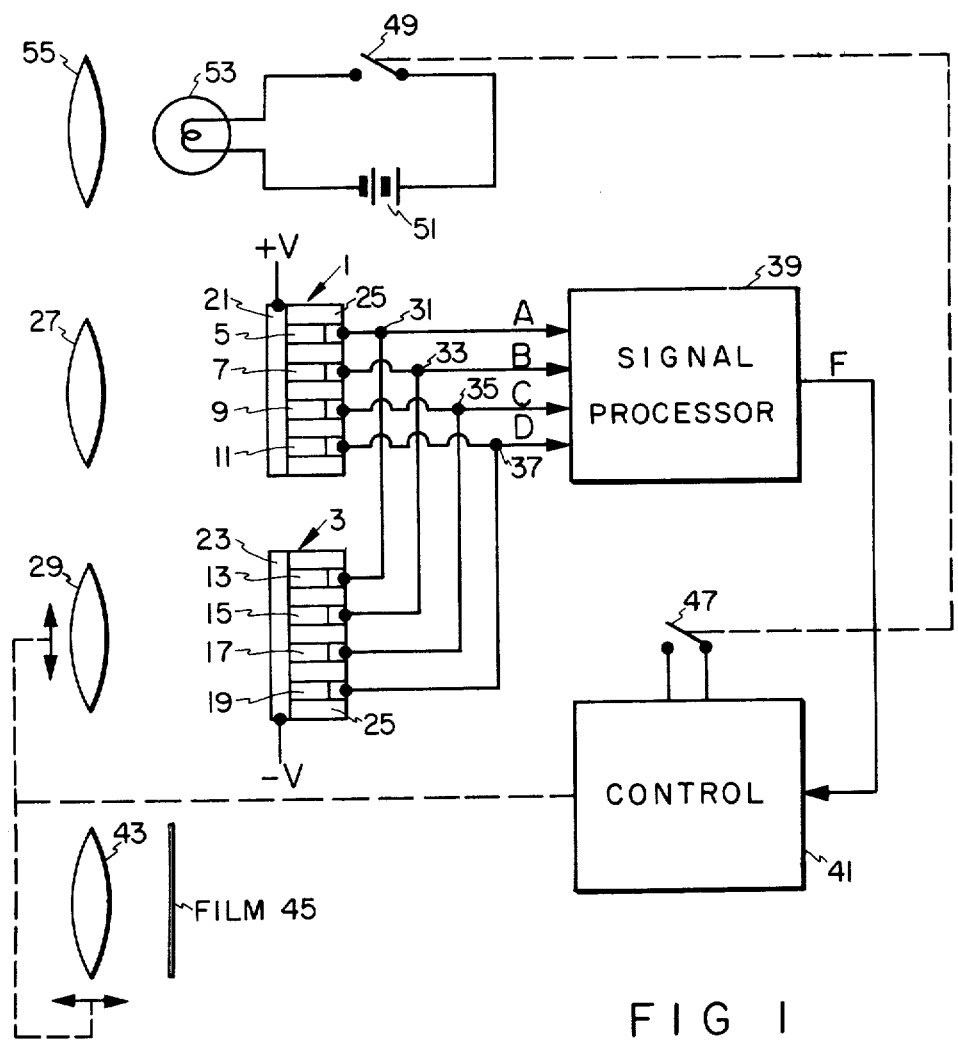
FIG. 1 is a schematic diagram of one embodiment of the present invention.

Referring to the drawings in more detail, FIG. 1 shows a first detector means 1 and a second detector means 3. Each of the detector means is made up of a linear array of a plurality of individual light responsive elements. In the present example, the first detector means 1 includes four light responsive elements, 5, 7, 9 and 11. The second light detector means 3 also includes four light responsive elements 13, 15, 17 and 19. The light responsive elements in the exemplary embodiment of FIG. 1 are photo-resistive elements. The elements in the first detector means 1 have a common terminal 21 connected to a first reference potential +V. The photo-resistive elements of the second detector means 3 also have a common terminal 23 which is connected to a second reference potential −V. Each photo-resistive element is insulated from the others by an insulating material 25. Although but four light responsive elements are shown in each detector means in the illustrative example, it will be appreciated that any number of detector elements may be used. The more elements that are used in each of the detectors, the greater will be the definition and reliability of the results obtained therefrom. A first lens 27 and a second lens 29 represent means for forming a first and second image of a relatively distant object. The two detector means 1 and 3 are shown as being positioned in coplanar relationship with respect to each other. Although the schematic representation in FIG. 1 shows the faces of the light detector means 1 and 3, it is understood that the faces which include the light responsive elements of the first and second detector means 1 and 3 are in actual construction facing the first and second lenses 27 and 29 to receive the radiation passing therethrough. A first image is therefrom formed on the face of the first detector means 1 from the radiation passing through the first lens 27, and a second image is formed on the face of the second detector means 3 from the radiation passing through the second lens 29. It is not essential that the first and second images be precisely focussed at the plane of the detectors; it is only necessary that the light pattern distribution of the two images can be matched with regard to the respective detectors. In that connection the two images may be significantly out of focus at the plane of the detectors so long as each light pattern formed on the plane of the detectors exhibits a distinguishable spatial radiation distribution.

As illustrated, both lenses 27 and 29 are arranged to form images of the same portion of the remote object or scene. It will be appreciated that both of the optical means are arranged to respond to a relatively small angle of view, for example on the order of 1–10°. The image formed by the first lens will be centered with respect to the detector means 1, the first lens and detector means being positionally fixed and coordinated with respect to a reference point in an associated view finder (not shown). That image will produce a signal at each of the light sensitive elements in the first detector means 1, each signal having a magnitude which is a function of the light level of that portion of the image which impinges on that individual element. As the second lens 29 is moved in a direction parallel to that of the linear displacement of light responsive elements in the second detector means 3, the light distribution pattern falling on the second detector means 3, which is substantially the same as the light distribution pattern formed on the first detector means 1 through the first lens 27, will be shifted in the direction of the linear displacement of the individual light responsive elements in the second detector means 3, as is more clearly illustrated in FIGS. 2, 3 and 4. Each light responsive element 5, 7, 9 and 11 of the first detector means 1 has a corresponding light responsive element 13, 15, 17 and 19, respectively, in the second detector means 3. The correspondence is based on the relative location of each light responsive element with respect to the particular array or detector means of which it forms a part. As hereinbefore mentioned, each light responsive element in the first and second light detector means 1 and 3 has a common terminal connected to a first and second reference potential, respectively. The other terminals of corresponding ones of the light responsive elements 5, 7, 9 and 11 and 13, 15, 17, and 19, are connected together at a common point 31, 33, 35 and 37, respectively, which, in turn, provide respective resultant signals A, B, C, and D for application to a signal processor 39. The signal processor 39 provides an output signal F which is applied to a control circuit 41. The control circuit is arranged to control the hereinbefore described movement of the second lens 29 and also the focussing movement of an objective lens means 43. The objective lens means 43 is arranged to focus a principal image of the object on a light sensitive film 45, for example. To distinguish the image formed on the light sensitive film 45 from the first and second images formed on the first and second detector means 1 and 3, the image formed on the light sensitive film 45 will be hereinafter referred to as the principal image, whereas the first and second images formed on the first and second detector means 1 and 3 will be hereinafter referred to as the first and second auxiliary images.

The control circuit 41 includes a selectively operable switching member 47. The switching member 47 may be arranged to initiate the focus detecting function of the present invention. The switching member 47 is coupled to a switching member 49 which provides a contact closure between a battery 51 and a source of illumination 53. A lens 55 concentrates the illumination from the source onto the object. Thus, the focus detecting system of the present invention may be rendered effective, even in an environment having limited ambient illumination, by coupling the simple light producing circuit including the lamp 53 to the control circuit of the focus detecting system of the present invention.

OPERATION OF THE FIG. 1 PREFERRED EMBODIMENT

Figure 2:
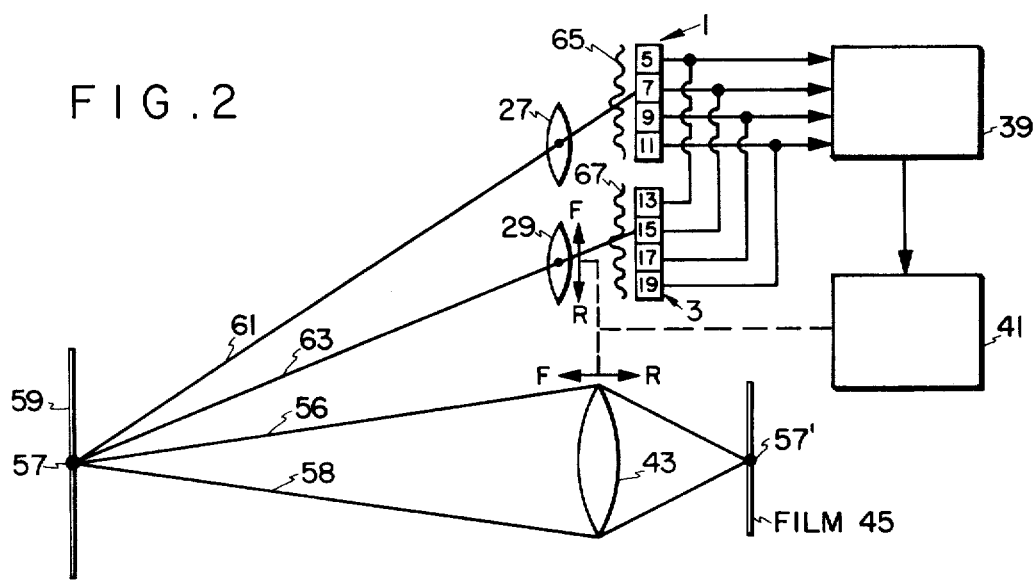
FIG. 2 is a schematic diagram of the embodiment shown in FIG. 1 and further illustrating the relative positions of the component parts of the embodiment when the principal image is substantially focussed.
Figure 3:
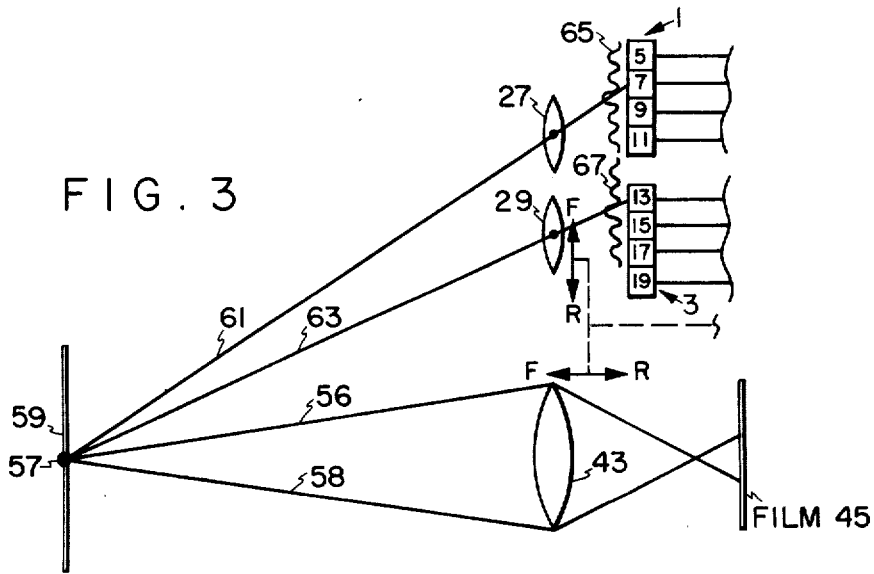
FIG. 3 is a schematic diagram of the embodiment shown in FIG. 1 and further illustrating the relative positions of the component parts when the principal image is defocussed in a first direction.
Figure 4:
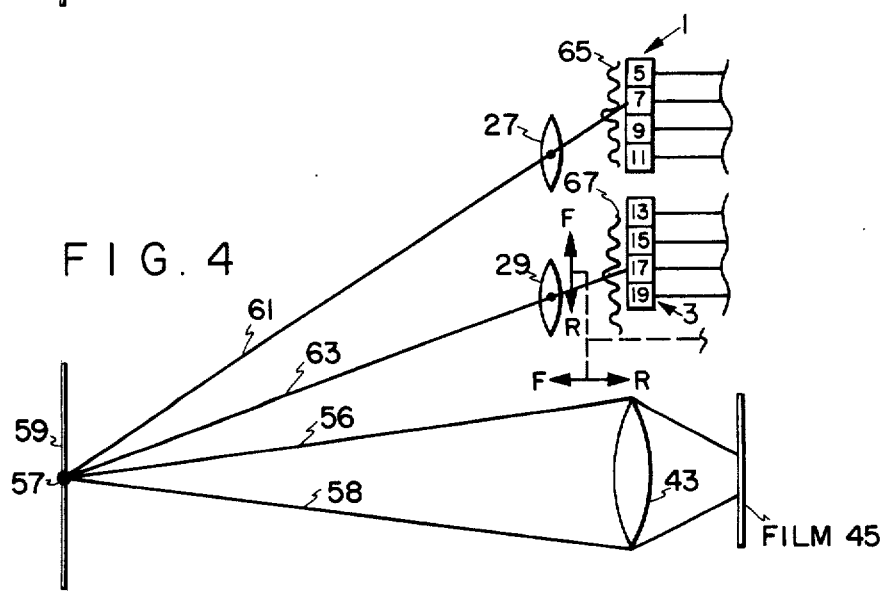
FIG. 4 is a schematic diagram of the embodiment shown in FIG. 1 showing the relative locations of the component parts when the principal image is defocused in another direction.

In explaining the operation of the embodiment shown in FIG. 1, reference is had to FIGS. 2, 3, 4, wherein components similar to those in FIG. 1 are shown with identical numerical designations. FIG. 2 shows the focus detecting apparatus when the principal image formed on the light senstive film 45 is in focus. Radiation beams or rays 56 and 58 from a point 57 on an object 59 to be focussed pass through the main objective lens 43 to form a principal image including the point 57' on the light sensitive film 45 of a camera, for example. Radiation beams or rays 61 and 63 also eminate from the point 57 and pass through the center of the first auxiliary lens 27 and the second auxiliary lens 29, respectively, to form first and second auxiliary images on the first detector means 1 and the second detector means 3, respectively. It should be noted that as the distance between the object to be photographed 59 and the focus detecting apparatus increases, the angle between the rays 61 and 63 will decrease. In FIG. 2, if the point 57 were a bright spot on an object 59 to be photographed, radiation from that bright spot would pass through the center of the first auxiliary lens 27 and fall on the second light responsive element 7 in the first detector means 1. Radiation from the point 57 would also pass through the second auxiliary lens 29 and fall on the second light responsive element 15 of the second detector means 3. Using a similar analysis, it can be readily seen that both the first and second auxiliary images will have similar radiation intensity distribution patterns 65 and 67. When the principal image on the light sensitive film 45 is properly focussed, the radiation intensity distribution patterns 65 and 67 will be coextensive with the first and second detector means 1 and 3 upon which they fall. Therefore, the difference between the signals or outputs of the corresponding light responsive elements in the first and second detector means or arrays will be substantially zero when the principal image is properly focussed.

With the photo-resistive elements used in the embodiment of FIG. 1, if the light intensities falling on the corresponding photo-resistive elements 5 and 13, for example, are equal, the potential drop across the two series-connected corresponding photo-resistive elements 5 and 13 will be equally divided, and therefore the signal A will be substantially zero volts. The common connection between the corresponding photo-resistive elements in the embodiment shown in FIG. 1 acts as a comparing means for comparing the intensity of light falling on the corresponding light responsive elements to provide resultant signals A, B, C, and D indicative thereof. The resultant signals, A, B, C, and D, when the system is properly focussed, will all be substantially zero. In that case, the output signal F from the signal processor 39 will be in minimum when the system is properly focussed. That minimum or valley is detected by the control circuit 41 which, in turn, acts to terminate the movement of the second auxiliary lens 29 and the main objective lens 43 when the principal image is properly focussed at the predetermined plane of the light sensitive film 45.

It should be remembered that the first and second auxiliary images appearing on the first and second detector means 1 and 3 do not have to be focussed in order for the present focus detecting apparatus to function properly. Even when the first and second auxiliary images are not focussed, similar light distribution patterns 65 and 67 will appear upon the faces of the first and second detector means 1 and 3.

When the principal image is not properly focussed, the relative position of the second auxiliary image 67 will be displaced with respect to the second detector means 3 as is more clearly illustrated in FIGS. 3 and 4. That relative displacement of the second auxiliary image with respect to the second detector means 3 will vary as a function of the distance between the camera, for example, and the object to be photographed. The present invention operates to sense that displacement and realign the light distribution pattern of the second auxiliary image with the second detector means 3 and concurrently move the objective lens 43 in such a manner that the light distribution pattern 67 of the second auxiliary image is made to be coextensive with respect to the second detector array or means 3 proportionately as the light distribution pattern 65 of the first auxiliary image is coextensive with the first detector array or means 1, at which time the principal image formed on the light sensitive film 45 is in focus.

In FIG. 3, the focus detecting apparatus of FIG. 1 is illustrated with the second auxiliary lens 29 and the main objective lens 43 shown in one extreme position. For purposes of explanation, the direction designations F (forward) and R (reverse), are used to indicate corresponding movements of the main objective lens 43 and the second auxiliary lens 29. For example, when the main objective lens 43 moves to the right or in the reverse direction R, the second auxiliary lens 29 moves down in its reverse direction R. Similarly, when the main objective lens moves to the left in its forward direction F, the second auxiliary lens 29 moves up in its forward direction F.

It is noted that, when the main objective lens 43 is in the position shown in FIG. 3, the principal image appearing on the light sensitive film 45 is not properly focussed. This can be seen since the rays 56 and 58 from the point 57 on the object 59 to be focussed do not form a unitary image of the point 59 on the light sensitive film 45, but rather intersect ahead of the film 45. The ray of light 61 passing through the center of the first auxiliary lens 27 falls on the second light responsive element 7 of the first detector means or array 1. However, unlike FIG. 2, the ray 63 passing through the second auxiliary lens 29 from the point 57 does not fall on the corresponding light responsive element 15 in the second detector means or array 3. Rather, the ray 63 from the point 57 passes through the second lens 29 and falls on the first light responsive element 13 in the second detector means 3. Therefore, following a similar analysis for every point on the object 59, it will be seen that the light distribution pattern 67 of the second auxiliary image falling on the second detector means 3 is not correspondingly aligned with the light responsive elements in the second detector array or means 3 as is the light distribution pattern 65 aligned with the light responsive elements of the first detector array or means 1. Therefore, comparing the signals representative of the intensity of light falling on corresponding light responsive elements in FIG. 3 will provide resultant signas A, B, C, and D which are not substantially zero. Therefore, the output signal F from the signal processor 39 will not be at a minimum value, as was the case in FIG. 2, and the principal image will not be properly focussed. The control circuit 41 will act in response to the signal processor output signal to continue to move the main objective lens 43 concurrently with the second auxiliary lens 29 until such a minimal signal, representative of a properly focussed principal image, is received.

In FIG. 4, the main objective lens 43 and the second auxiliary lens 29 are in their respective extreme reverse positions. The principal image in the light sensitive film 45 is again unfocussed, since the image of the point 57 is formed behind the light sensitive film 45. The ray 61 passing through the center of the first auxiliary lens 27 falls on the second light responsive element 7 on the first detector array or means 1, while the ray 63 from the point 57 on the object 59 passes through the second auxiliary lens 29 and falls on the third light responsive element 17 of the light detector means or array 3. Accordingly, the intensity distribution pattern of the second auxiliary image falling on the second light detector means 3 is displaced downwardly with respect to the second detector means 3 as compared to the intensity distribution pattern 65 of the first auxiliary image appearing on the first detector means 1. Therefore, again, there will exist a difference in radiation intensity falling on corresponding light responsive elements of the first and second detector means 1 and 3, thereby providing one or more resultant signals A, B, C, and D which are not substantially zero. Those resultant signals, as hereinbefore explained in connection with FIG. 3, are effective to continue the movement of the main objective lens 43 and the second auxiliary lens 29 until no difference in intensity exists between corresponding light responsive elements of the first and second detector means 1 and 3 and the resultant signals applied to the signal processor 39 are substantially zero. At that time, the principal image on the light sensitive film 45 will be properly focussed, and the control circuit will terminate the movement of the main objective lens 43 and the second auxiliary lens 29.

Figure 5:
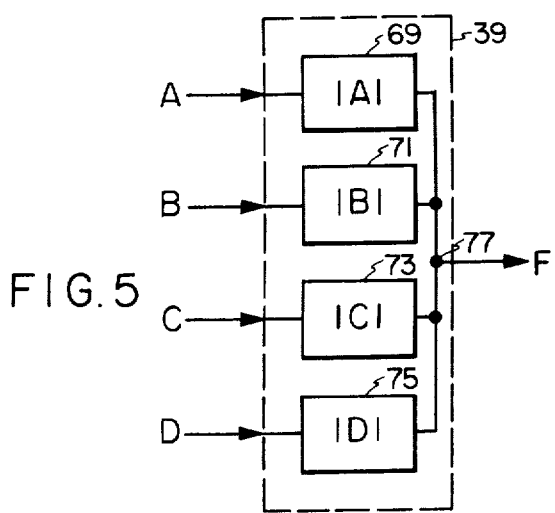
FIG. 5 is a schematic diagram of one embodiment of the signal processor as shown in FIG. 1.

FIGS. 5, 6, 7 and 8 show alternative arrangements of the signal processor 39 shown in FIG. 1. In FIG. 5, the signal processor 39 includes four absolute value circuits 69, 71, 73, and 75. The resultant signals A, B, C, and D are applied to the absolute value circuits 69, 71, 73 and 75, respectively. The absolute value circuits derive the values from the resultant signals A, B, C, and D, and sum those absolute values at a common junction 77, thereby providing the output signal F of the signal processor 39. When the resultant signals A, B, C, and D are substantially zero, i.e., when no difference in illumination exists between corresponding light responsive elements of the first and second detector means 1 and 3, the output signal F from the signal processor 39 will be at a minimal value which may be substantially zero. If any illumination difference exists between any pair of corresponding light responsive elements of the first and second detector means 1 and 3, one or more of the corresponding resultant signals A, B, C, and D will have either a positive or a negative magnitude. For example, if the light distribution pattern of the second auxiliary image falling on the second detector array 3 is shifted in one direction with respect to the second detector means 3, the radiation intensity falling on the first light responsive element 5 of the first detector means 1 will not be the same as the intensity of radiation falling on the first light responsive element 13 of the second detector means 3. If a greater amount of radiation falls on the photo-resistive element 5 than falls on the photo-resistive element 13, the effective resistance of the element 5 will be less than that of the element 13, and the common junction 31 between the corresponding photo-resistive elements 5 and 13 will have a positive magnitude. On the other hand, if a greater amount of radiation falls on the photo-resistive element 13 than falls on the photo-resistive element 5, the effective resistance of the photo-resistive element 13 will be less than that of the corresponding photo-resistive element 5, and the resultant signal A will have a negative value, since a greater potential drop will appear across the photo-resistive element 5 than appears across the photo-resistive element 13. In either case, the signal processor of FIG. 5 will take the absolute values of the resultant signals and sum those values to provide the output signal F without regard to the sign. Changing the sign of all negative resultant signals before summing them obviates having some positive signals sum with some negative signals to produce a spurious zero or minimum. Therefore, the signal processor 39 will provide an output signal indicative of a non-focus condition whenever the intensity distribution pattern of the second auxiliary image is not identically aligned with the second detector means 3 as the intensity distribution pattern of the first auxiliary image is aligned with the first detector means 1, regardless of the direction of the misalignment.

Figure 6:
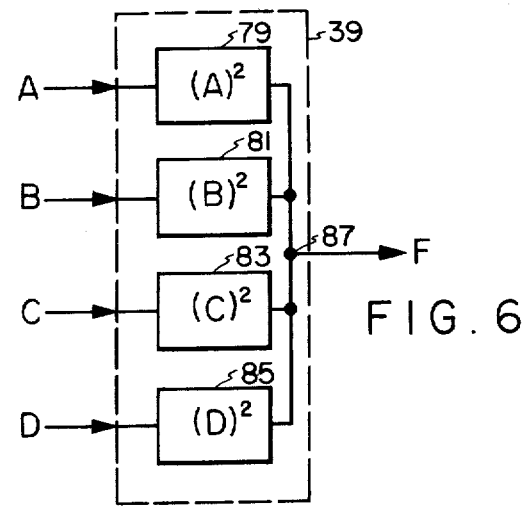
FIG. 6 is a schematic diagram of another embodiment of the signal processor shown in FIG. 1.

The signal processor 39 shown in FIG. 6 comprises four squaring circuits 79, 81, 83, and 85. The resultant signals A, B, C, and D are applied to the squaring circuits 79, 81, 83, and 85, which in turn provide output signals, the values of which are all positive, representative of the absolute values of the signals A, B, C, and D. Those signals are summed at a common output terminal 87 to provide the output signal F of the signal processor 39.

Figure 7:
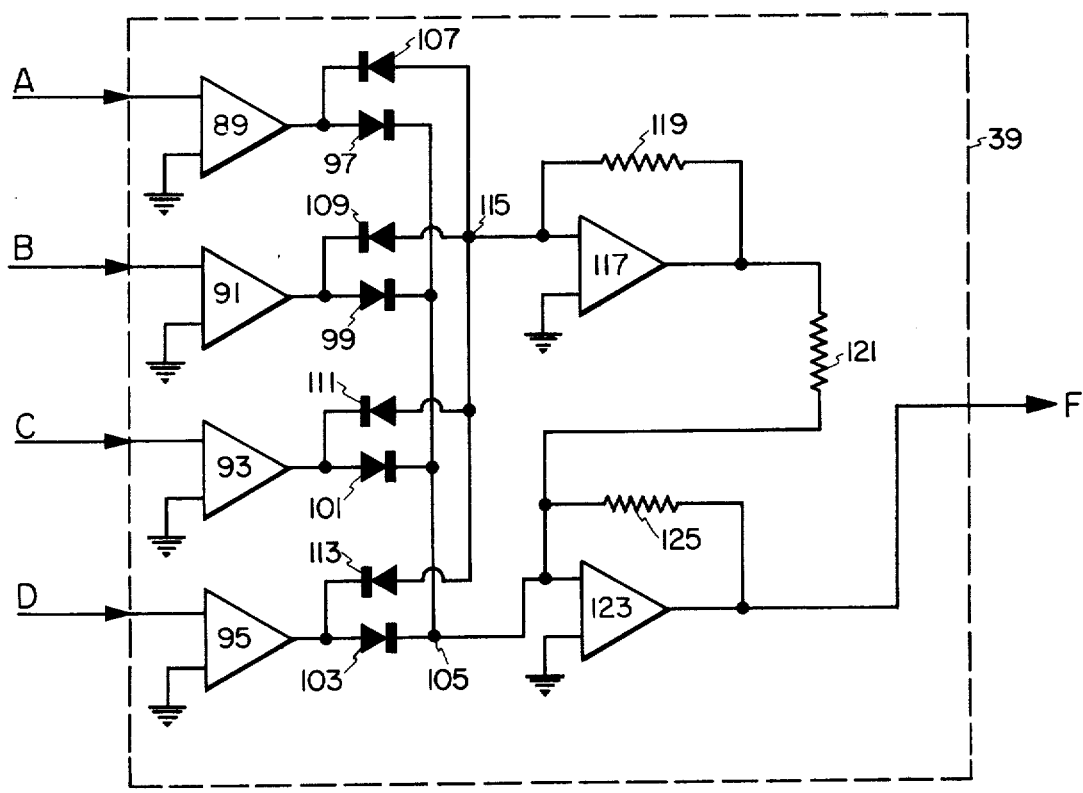
FIG. 7 is a schematic diagram of still another embodiment of the signal processor shown in FIG. 1.

The signal processor 39 shown in FIG. 7 is substantially comprised of a rectifier and summer circuit. The resultant signals A, B, C, and D are applied to corresponding amplifiers 89, 91, 93, and 95, respectively, all of which are referenced to a common point. Each of the amplifiers 89, 91, 93, and 95 has its output terminal connected through the anode to cathode path of an associated diode 97, 99, 101, and 103 to a first common point 105. Each output terminal of the amplifiers 89, 91, 93, and 95 is also connected through the cathode to anode path of another associated diode 107, 109, 111, and 113, respectively, to a second common point 115. The second common point 115 is connected to a first input terminal of an inverting amplifier 117. A second input to the amplifier 117 is connected to the common reference. A feedback resistor 119 is connected between the first input of the amplifier 117 and its output terminal. The output terminal of the amplifier 117 is connected through a resistor 121 to a first input terminal of an output amplifier 123. The first input terminal of the amplifier 123 is also connected to the first common point 105. The amplifier 123 has a second input terminal connected to the common reference. A feedback resistor 125 connects the first input terminal of the amplifier 123 with its output terminal. The output terminal of the amplifier 123 provides the output signal F of the signal processor 39.

If any one of the resultant signals A, B, C, or D at any time has a positive magnitude, that signal will be passed through its associated amplifier 89, 91, 93, or 95, respectively, and will forward bias one of the diodes 97, 99, 101, and 103 connected to the output terminal of the particular amplifier. The forward biased diodes pass the applied signal therethrough to be summed at the first common point 105. If the output of any of the amplifiers 89, 91, 93, or 95 is negative, its associated diode 107, 109, 111, or 113 will become forward biased and pass that signal therethrough to be summed at the second common point 115 and applied to the input terminal of the inverting amplifier 117. That signal in turn will be inverted by the amplifier 117 and added to the signal appearing at the first common point 105 to provide the input signal to the amplifier 123. Therefore, any negative resultant signals will be inverted and added to any positive resultant signals to provide the output signal F of the signal processor 39.

Figure 8:
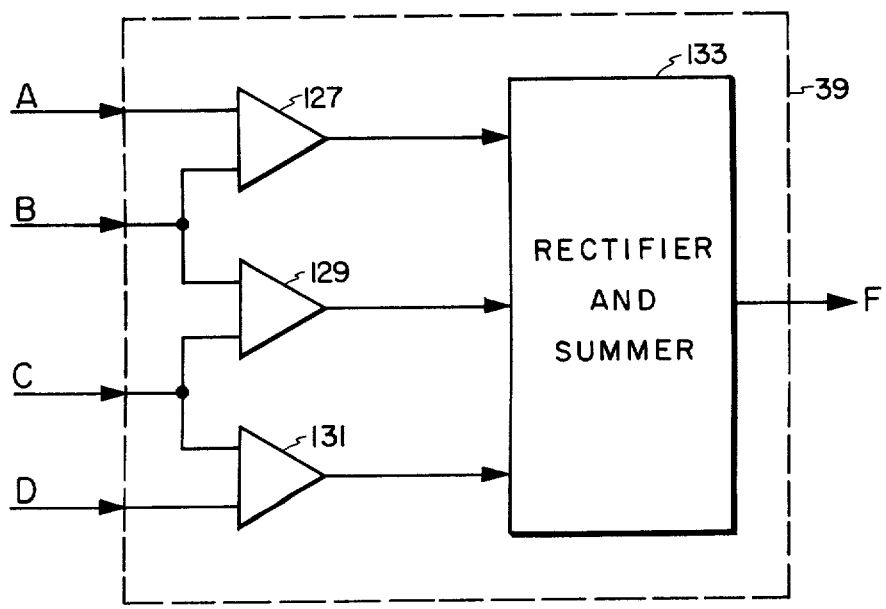
FIG. 8 is a schematic diagram of yet another embodiment of the signal processor shown in FIG. 1.

FIG. 8 shows another version of the signal processor 39 wherein the resultant signals A, B, C, and D are referenced with respect to each other, thereby emphasizing the difference in illumination of corresponding light responsive elements. The arrangement shown in FIG. 8 will also compensate for differences in the optical transmission of each auxiliary lens which would unbalance other systems. The signal processor 39 in FIG. 8 includes three amplifiers 127, 129, and 131. Each amplifier receives as inputs thereto a sequential pair of resultant signals, and provides a correlated signal representative of each of the sequential comparisons, which is in turn applied to a rectifier and summer circuit 133. The rectifier and summer circuit 133 may be similar to the rectifier and summer circuit shown in FIG. 7 with one of the amplifiers and its associated diodes removed. The comparing amplifier 127 receives the resultant signals A and B and provides a correlated signal at the output thereof. Similarly, comparator amplifier 129 receives resultant signals B and C, and comparator amplifier 131 receives resultant signals C and D, each providing its respective correlated signal for application to the rectifier and summer circuit 133.

FIG. 9 shows the light responsive elements of the first and second detector means of FIG. 1 disposed on a single substrate 132. The first four light responsive elements 5, 7, 9, and 11 comprise the first detector array or means, while the second four light responsive elements 13, 15, 17, and 19 comprise the second detector array or means. By having all the light responsive elements disposed on a single substrate, more uniformity between the electrical characteristics of the light responsive elements is obtained, and the variances in those electrical characteristics with the passage of time may be reduced to a minimum. The first and second auxiliary images formed by the first and second auxiliary lenses 27 and 29 fall on an auxiliary image plane 134. A first bundle of light pipes 135 defines a first selectively variable radiation path between the auxiliary image plane 134 and the first detector means comprising the first set of four light responsive elements. A second bundle of light pipes 137 defines a selectively variable radiation path between the auxiliary image plane 134 and the second detector means comprising the second set of four light responsive elements on the common substrate 132. The first bundle of light pipes 135 is arranged to transmit the radiation intensity distribution from the first auxiliary image formed by the first auxiliary lens 27 from the auxiliary image plane 134 to the first detector means; the second bundle of light pipes 137 is arranged to transmit the radiation intensity distribution of the second auxiliary image formed by the second auxiliary lens 29 from the auxiliary image plane 34 to the second detector means on the common substrate 132. Through the use of the bundles of light pipes 135 and 137, a greater degree of flexibility in design is provided, whereby optimum advantage may be taken of the available space in the particular application of the focus detecting apparatus. That is of great advantage when the application is to a hand-held camera which is desirably small and easy to handle. For example, although the first and second detector means 1 and 3 are shown displaced colinearly with the linear displacement of the light responsive elements of each detector means in FIG. 1, the use of light pipes would allow the first and second detector means to be displaced side-by-side, one on top of the other, i.e. to be displaced parallely with respect to the direction of linear displacement of the elements, as shown in FIG. 11. Further, the use of light pipes would permit movement of the bundle of light pipes 137 with respect to the second radiation intensity distribution pattern on the plane 134 as an alternative to the movement of the second auxiliary lens 29.

In FIG. 10 a first auxiliary lens 139 forms a first auxiliary image. A second auxiliary lens 141 is arranged to form a second auxiliary image. In the embodiment shown in FIG. 10, both auxiliary lenses 139 and 141 are stationary. The first light detector array or means which is arranged to sense the intensity distribution of the first auxiliary image comprises the light responsive elements 5, 7, 9, and 11. The second detector means or array which is arranged to detect the radiation intensity distribution of the second auxiliary image comprises light responsive elements 13, 15, 17, and 19. The light responsive elements of the first and second detector arrays may be connected to a signal processor and control circuit as shown in FIG. 1. A prism 143 is arranged between the second auxiliary lens 141 and the second detector array comprising the light responsive elements 13, 15, 17, and 19. The prism 143 shifts or alters the course of the second auxiliary optical path and therefore shifts the radiation intensity distribution of the second auxiliary image, intact, along the second detector means. A common substrate 145, upon which all of the light responsive elements are disposed, is arranged to move in forward and reverse directions as indicated. The movement of the common substrate 145 including all of the light responsive elements is coordinated with the movement of the main objective lens 43 which forms the principal image on the light sensitive film 45. Since the prism 143 does not substantially adulterate or modify the radiation intensity distribution of the second auxiliary image, but merely alters the angle of incidence of the second optical path with the second detector means, the movement of the common substrate in forward and reverse directions effectively accomplishes the shifting of the radiation intensity distribution of the second auxiliary image along the second detector means comprising the light responsive elements 13, 15, 17, and 19. That effective shifting of the radiation distribution of the second auxiliary image by means of the prism 143 with the movement of the common substrate 145 accomplishes the same function as the movement of the second auxiliary lens 29 with respect to the second detector means 3 in FIG. 1. Therefore, when the radiation intensity distribution of the first auxiliary image falling on the first detector array is in the same position with respect to the first detector array as the radiation distribution of the second auxiliary image is with respect to the second detector array, the principal image formed by the main objective lens 43 and appearing on the light sensitive film 45 will be properly focussed.

FIG. 11 shows an arrangement of the first and second detector means wherein each light responsive element of the first detector means 1' is displaced vertically from its corresponding light responsive element in the second detector means 3'. That arrangement is in contradistinction to the arrangement shown in FIG. 1, for example, wherein corresponding light responsive elements are displaced in the same direction as the displacement of sequential light responsive elements in each detector means. The physical arrangement of the light responsive elements shown in FIG. 11 may advantageously make use of the light pipe bundles 135 and 137 as was hereinbefore explained in connection with FIG. 9.

FIG. 11 further illustrates that the light responsive elements may also be photo-voltaic in nature rather than photo-resistive in nature as heretofore shown. The first light detector array or means 1' includes the photo-voltaic elements 5', 7', 9', and 11'. The second detector means or array 3' includes the photo-voltaic corresponding light responsive elements 13', 15', 17', and 19', respectively. Each photo-voltaic element provides a voltage representative of the intensity of the light falling thereon. When photo-voltaic elements are used, an additional comparator circuit 147 may be used to provide resultant signals A', B', C', and D' similar to those of FIG. 1. The comparator circuit 147 includes four comparator amplifiers 149, 151, 153, and 155. Each comparator amplifier receives as inputs thereto the signals generated by corresponding photo-voltaic elements. For example, comparator amplifier 149 receives signals from the corresponding photo-voltaic elements 5' and 13'. Similarly, comparator amplifiers 151, 153, and 155 receive the signals generated by corresponding photo-voltaic elements 7' and 15', 9' and 17', and 11' and 19', respectively. The resultant signals A', B', C', and D' from the comparator circuit 147 may be applied to the signal processor 39 shown in FIG. 1. When the intensity of the radiation falling on corresponding photo-voltaic elements 5' and 13', for example, is equal, the resultant signal A' will be substantially zero. If the intensity of the radiation falling on the photo-voltaic element 5' is greater than the intensity of the radiation falling on the photo-voltaic element 13', the resultant signal A' will have a positive value. Conversely, when the intensity of the radiation falling on the photo-voltaic element 13' is greater than the intensity of the radiation falling on the photo-voltaic element 5' the resultant signal A' will have a negative value. Therefore, the embodiment shown in FIG. 11 accomplishes the same result by using photo-voltaic light responsive elements as the embodiment shown in FIG. 1 accomplished with the use of the photo-resistive light responsive elements.

Figure 12:
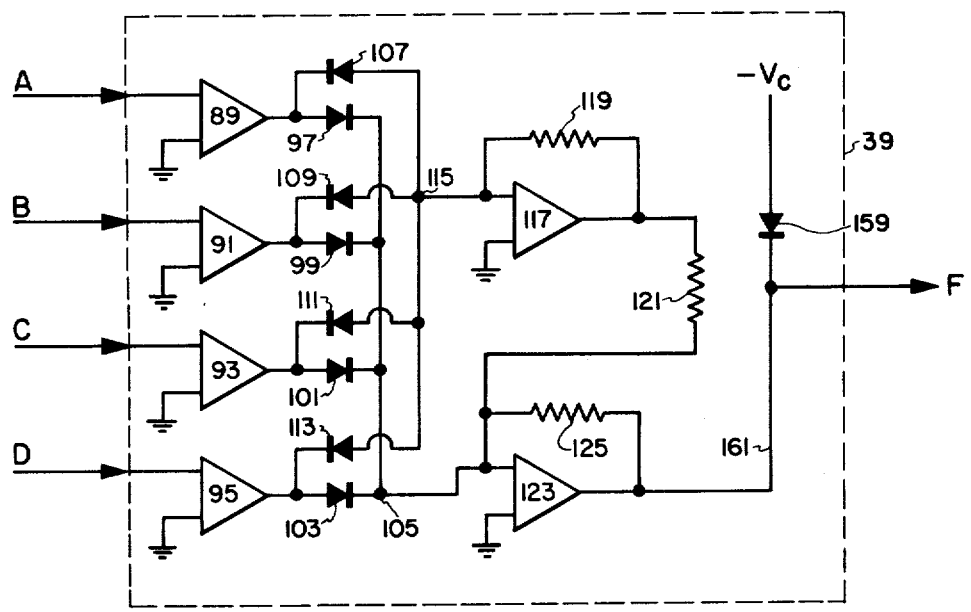
FIG. 12 is a schematic diagram of a modification to the signal processor shown in FIG. 7.

FIG. 12 shows another version of the signal processor 39 which is useful in any of the arrangements of FIGS. 1, 9, 10, and 11. In connection with the following description of this form of signal processor, it will be helpful to recall, with reference to the arrangement of FIG. 1, for example, that the output signal F decreases as the condition of best focus for the lens 43 is approached. Specifically, the output signal F decreases toward a minimum value as the means 41, which is controlled by this signal, moves the second lens 29 toward the position giving the most similar light distributions of the auxiliary images on the detector means 1 and 3, and concurrently moves the main objective lens 43 toward the position of best focus for the particular object distance then existent. The means 41 stops moving the lenses 43 and 29 when the means 41 senses that the signal F has reached its minimum value, thereby stopping the movement of the lens 29 in the position of best auxiliary image light distribution correspondence on the detector means, and stopping the movement of the lens 43 in the position of best focus.

It has been found that, as the above-described focussing operation takes place, the decreasing signal F is often subject or minor dips or minima before the primary or true minimum value, indicative of best focus, is reached. These minor minima are related to the complex interaction which exits between image brightness distribution and image position on the detector means as the focussing action proceeds, and may also be introduced by camera motion occurring while this action is taking place. An example of the way in which such minor minima affect the signal F during a typical focussing operation is shown by the curve 157 of FIG. 13. This curve shows the value of the signal F plotted against the position of the lens 43 for movement of the latter from either extreme position to the position of best focus for a paraticular object distance.

The presence of the above-described minor minima in the value of the signal F as illustrated by the curve 157 has been found to be disadvantageous. This is so because there is a tendency for the means 41 to respond to one or another of these minima, and to prematurely terminate the focussing operation before the true signal minimum and the best focus postion of the lens 43 are reached. It is thus desirable to make the apparatus of the present invention insensitive to these minor minima, so that any tendency for the apparatus to terminate its focussing movement of the lens 43 prematurely and improperly will be positively avoided.

A preferred way of accomplishing the foregoing is to provide a voltage clamping or limiting action in the apparatus which will prevent the means 41 from seeing or responding to any minimum condition of the output signal other than the true minimum, and which will therefore prevent the termination of the focussing action by other than the occurrence of this true minimum. The signal processor 39 of FIG. 12 illustrates, by way of example, one desirable means for providing such a clamping action. Thus, this signal processor includes all of the components and connections included in the signal processor 39 of FIG. 7, and in addition includes a clamping diode 159. This diode is connected between a terminal of a suitable source of negative biasing voltage $-V_c$ and a conductor 161 on which the output signal F is produced. As a result, the signal F produced by the FIG. 12 signal processor is clamped at a value, determined by the value of the biasing voltage $-V_c$, which is made to be sufficiently low to prevent the signal F from experiencing said minor minima, and which is made to be sufficiently high to assure that the true minimum value falls below the clamp level, even for objects which produce a non-zero true minimum value.

Figure 13:
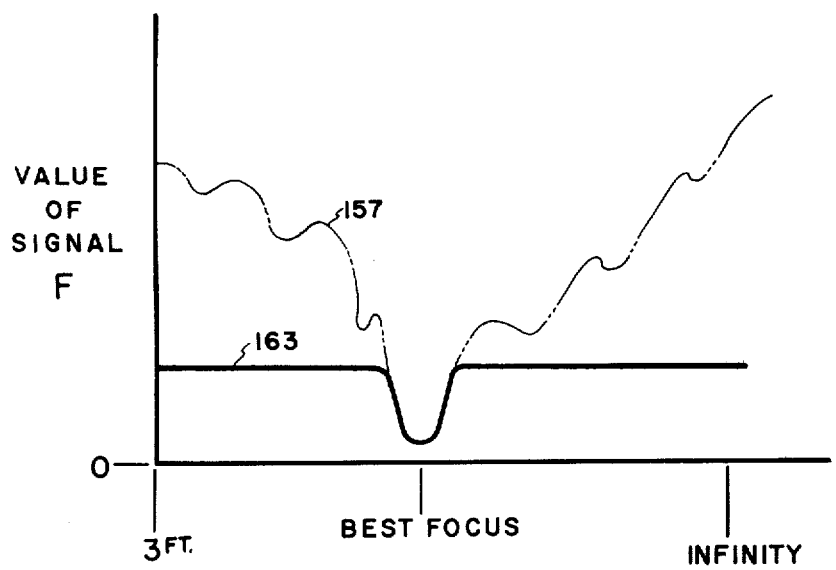
FIG. 13 is a pair of curves which illustrate the operation of the signal processor of FIG. 12.

The manner in which such a clamped output signal F varies as the lenses 29 and 43 are moved is illustrated by the typical curve 163 of FIG. 13. It is apparent from this curve that the signal processor of FIG. 12 will not cause the means 41 to stop the movement of the lenses until the occurrence of the true minimum value of the signal F. Therefore, the use of the FIG. 12 form of signal processor assures that the arrangement including it will position the lens 43 for best focus with a high degree of accuracy, reliability, and consistency. It is noted that, instead of the diode 159, other means, such as a saturating feedback amplifier, may be employed to limit the signal F and to prevent the focussing action from being prematurely terminated. It is noted also that the means for preventing premature termination of the focussing action may be used with signal processors of the form shown in FIGS. 5, 6, and 8, as well as with the form of FIG. 7 as illustrated.

In the arrangements disclosed herein so far, each of the resultant signals from a corresponding pair of light responsive elements, such as the resultant signal A, represents the difference between the intensities of the light falling on the corresponding two light responsive elements. While this procedure provides the useful results hereinbefore described, even more desirable results can be obtained if each resultant signal is made to represent the ratio, instead of the difference, of the intensities of the light falling on the corresponding two light responsive elements.

The reason for the forgoing is that, when the resultant signal represents the difference of the two light intensities, the value of the resultant signal, for any given percentage of non-similar light distribution on the two detector means or degree of light intensity unbalance, varies as the scene or object absolute light level or brightness varies. Since the detection of the minimum signal, indicative of best focus, becomes unreliable if the resultant signals have too wide a range of variation due to absolute light level variation, the use of resultant signals representing light intensity differences significantly restricts the range of absolute light level over which the arrangements can be successfully used.

On the other hand, when each resultant signal is made to represent the ratio of the corresponding two light intensities, the value of the resultant signal is essentially independent of the absolute light level within wide limits. This permits the apparatus to operate successfully and focus accurately over a significantly wider range of scene brightness than is possible when the resultant signals represent light intensity differences. One desirable way of making each resultant signal represent the ratio of the corresponding two light intensities is to make this resultant signal represent the difference between two signals which, in turn, respectively represent the logs of these light intensities. One convenient way of accomplishing this is to make each resultant signal the output signal of a differential amplifier, and to make each input signal for the amplifier representative of, or proportional to, the log of the light intensity on the corresponding light responsive element. One desirable way of obtaining such log signals is to place a diode in series with each light responsive element and to take the element signal for the differential amplifier input from across the diode. An arrangement so using diodes and differential amplifiers, for providing resultant signals A, B, C, and D representing the ratios of the light intensities on corresponding pairs of light responsive elements, is illustrated by way of example in FIG. 14.

Figure 14:
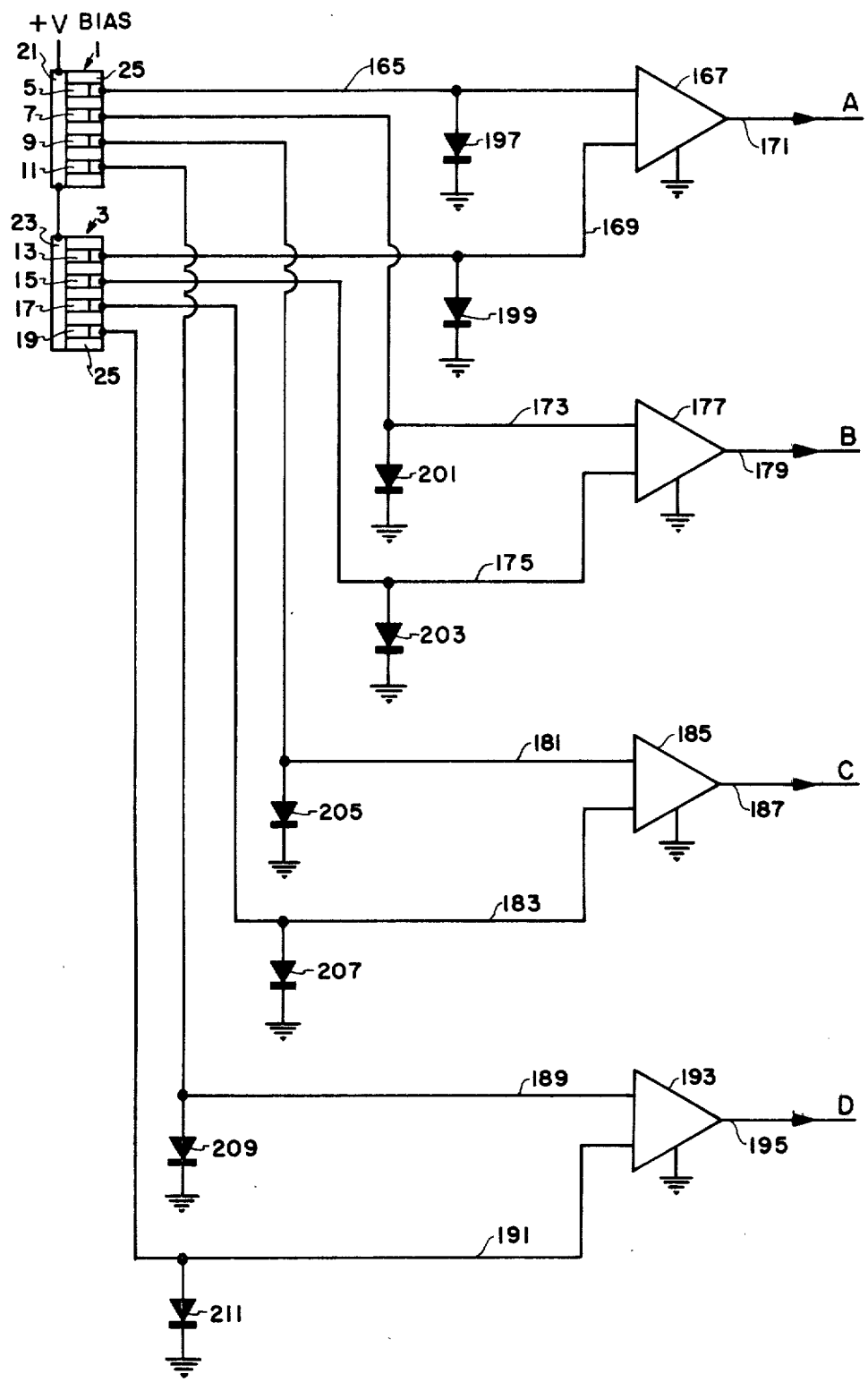
FIG. 14 is a schematic diagram of a modification to a portion of the FIG. 1 embodiment.

The arrangement of FIG. 14 is shown as receiving and comparing the signals from the light responsive elements of two detector means, which have been shown, by way of example, as being the detector means 1 and 3 of the arrangement of FIG. 1. Accordingly, the FIG. 14 arrangement represents a modification to a portion of the FIG. 1 arrangement. For the purposes of the present illustration, the elements 5, 7, 9, 11, 13, 15, 17, and 19 of the detector means 1 and 3 are considered to be photodiodes employed as currend generators. Thus, in FIG. 14, one terminal of the element 5 of the detector means 1 is connected by a conductor 165 to one input terminal of a differential amplifier 167, and the second input terminal of the latter is connected by a conductor 169 to one terminal of the corresponding element 13 of the detector means 3. The output terminal of the amplifier 167 is connected to a conductor 171 on which the resultant signal A is produced.

Similarly, one terminal of each of the elements 7 and 15 is connected by a corresponding one of conductors 173 and 175 to the corresponding one of the two input terminals of a differential amplifier 177. The output terminal of the latter is connected to a conductor 179 on which the resultant signal B is produced. Further, one terminal of each of the elements 9 and 17 is connected by a corresponding one of conductors 181 and 183 to the corresponding one of the two input terminals of a differential amplifer 185, the output terminal of which is connected to a conductor 187 on which the resultant signal C is produced. Finally, one terminal of each of the elements 11 and 19 is connected by a corresponding one of conductors 189 and 191 to the corresponding one of the two input terminals of a differential amplifier 193, the output terminal of which is connected to a conductor 195 on which the resultant signal D is produced.

In order to cause the element signals applied to the inputs of the differential amplifiers to represent the logs of the light intensities on the corresponding elements, diodes 197, 199, 201, 203, 205, 207, 209, and 211 are connected, respectively, between the conductors 165, 169, 173, 175, 181, 183, 189, and 191 and a common reference point, which is also the common reference point for the amplifiers 167, 177, 185, and 193. The remaining or common terminals 21 and 23 of the elements of the detector means 1 and 3 are also effectively connected to said common reference point by being connected to the positive terminal +V of a suitable source of bias voltage, the negative terminal of which (not shown) is connected to said common reference point. The purpose of this bias voltage is to assure that all photocarriers produced in the photodiodes are collected, and the value of this voltage is desirably made to be such as to achieve this result. In those instances where such a bias voltage is not required, it can be omitted, in which case the common terminals 21 and 23 would be connected directly to the common reference point.

As a result of the construction just described, each of the amplifiers 167, 177, 185, and 193 compares or responds to the difference between the two signals appearing across the corresponding two of the diodes 197 through 211. Thus, each of said amplifiers compares two signals which represent the logs of the intensities of the light falling on the light responsive elements of the corresponding pair of those elements. As a result, each of the resultant signals A, B, C, and D represents the ratio of the intensities of the light falling on the elements of the corresponding pair. It is intended, in accordance with the present invention, that these resultant signals be applied to any of the signal processors of FIGS. 5, 6, 7, 8, and 12.

In connection with the arrangement just described, it is noted that the circuit of FIG. 14 could be connected to any of the detector means of FIGS. 9, 10, and 11, instead of to the detector means of FIG. 1 as illustrated, or could be embodied in the chip circuitry of FIGS. 15 through 21 to be described hereinafter. Also, if desired, transistors connected to function as diodes could be used in place of the diodes 197, etc. Moreover, more than one diode or transistor could be associated with each light responsive element as necessary to obtain the degree of log response desired. Further, the necessary log response could be obtained in other ways than that illustrated, as by the use of very high input impedance amplifiers, or by the use of feedback amplifiers having diodes included in their feedback logs.

Figure 15:
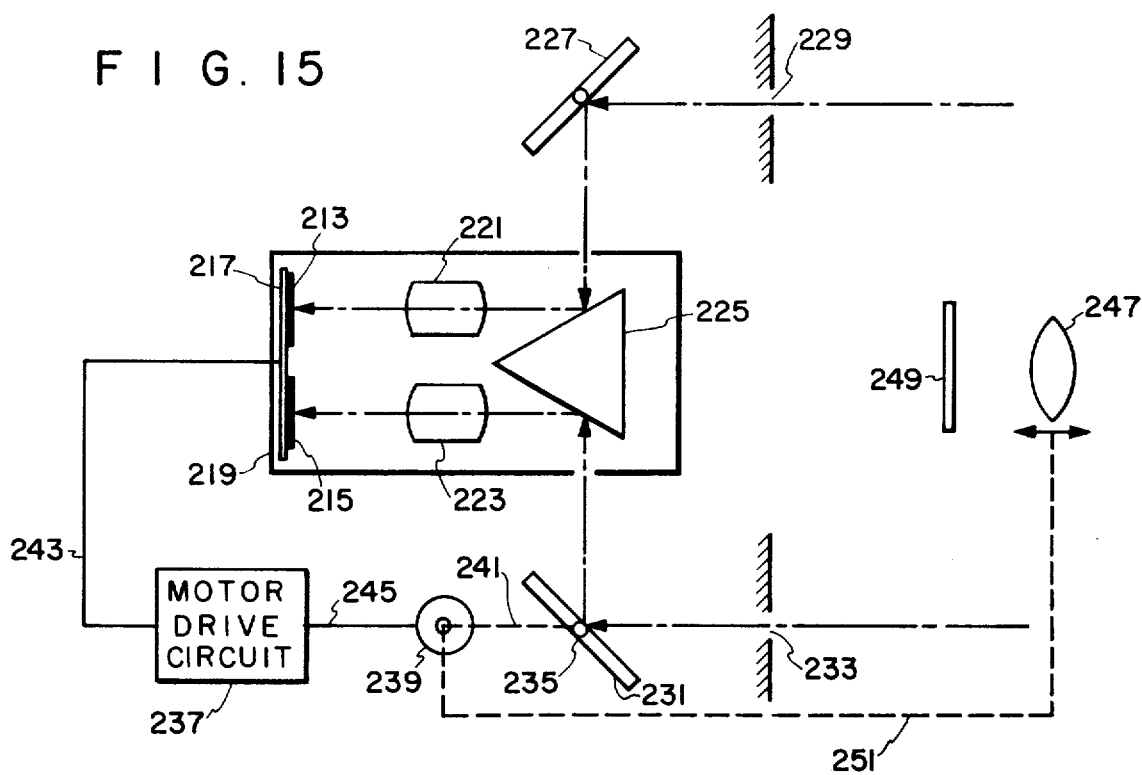
FIG. 15 is a schematic diagram of a modification to the FIG. 1 embodiment employing a modular configuration for certain of the components.

FIG. 15 illustrates still aother modification to the embodiment of FIG. 1 which, like the embodiments of FIGS. 9 and 10, makes it possible to dispose the first and second detector means very closely together on a single substrate. The FIG. 15 embodiment, however, illustrates a different, modular arrangement of the auxiliary image conducting or producing means for bringing the two auxiliary images sufficiently close together to permit the use of such a single substrate detector configuration.

Accordingly, in the FIG. 15 arrangement, a common substrate detector configuration, including the light responsive elements making up first and second detector arrays or means 213 and 215, is included as a portion of an integrated circuit chip 217 which, in turn, is included in a module 219. The latter also includes first and second auxiliary lenses 221 and 223, respectively, and a reflecting prism or mirror 225. The chip 217 desirably includes the amplifiers and other signal handling circuitry, such as is shown in FIGS. 5, 6, 7, 8, 12, and/or 14, and a minimum or valley detecting circuit, such as that stated as being included in the control circuit 41, as necessary to cause the chip to produce a logic output signal which shifts from one logic state to the other only upon the occurrence of a minimum difference in the light distributions of the two auxiliary images on the respective detector means 213 and 215.

In addition to the first auxiliary lens 221 and a portion of the prism 225, the means for producing the first auxiliary image on the first detector means 213 includes a mirror 227 and an aperture 229. In addition to the second auxiliary lens 223 and a portion of the prism 225, the means for producing the second auxiliary image on the second detector means 215 includes a mirror 231 and an aperture 233. The apertures 229 and 233 are desirably so positioned and sized as to confine each of the auxiliary images to the corresponding detector means without vignetting either image on the corresponding detector means. The paths over which the light passes in forming the two auxiliary images are shown by light dashed lines in FIG. 15.

In the FIG. 15 arrangement, the shifting of the second auxiliary image on the second detector means, to shift the image light distribution thereon, is accomplished by rotating the mirror 231 about an axis defined by a mirror-supporting shaft 235. To this end, the FIG. 15 arrangement includes a motor drive circuit 237 and a motor 239. The latter is coupled to the mirror shaft 235 by a suitable linkage 241 so that rotation of the motor 239 rotates the shaft 235 and hence rotates the mirror 231. A conductor 243 is connected between the output of the chip 217 and the input of the drive circuit 237 to apply to the latter the logic output signal produced by the chip 217. The output of the drive circuit 237 is connected by a conductor 245 to the motor 239. The drive circuit 237 may be simply a transistor power amplifier or switch which energizes the motor 239 for rotation when the logic output signal from the chip 217 has said one logic state, and which stops the rotation of the motor 239 as soon as said logic output signal shifts to said other state, indicative of best auxiliary image light distribution correspondence.

It is intended that the module 219 and the other structure of FIG. 15 be included in a means, such as a camera, which includes an objective lens or other optical element to be automatically maintained in a position of best focus. Accordingly, FIG. 15 shows such a lens 247 arranged to produce on a light sensitive film 249 a principal image of the object whose auxiliary images are formed on the detector means 213 and 215. The lens 247 is coupled by a suitable linkage 251 to the motor 239 for simultaneous and correlated movement with the mirror 231. This coupling is so arranged that, when the movement of the mirror 231 by the motor 239 is terminated at the position giving best auxiliary image light distribution correspondence on the detector means 213 and 215, the movement of the lens 247 is simultaneously terminated at the position which gives the best focus of the principal image on the film 249. The mirror 227 is desirably made to be rotatable about its axis to facilitate the initial calibration of the arrangement as necessary to obtain this correlated action.

The operation of the FIG. 15 arrangement is the equivalent of that of the FIG. 1 arrangement. Thus, if the distance from the arrangement to the object changes from one at which the lens 247 was in the position of best focus, the condition of best light distribution correspondence of the auxiliary images of the object on the detector means is lost. The resulting light sensitive element unbalance signals then cause the chip output signal to assume said one state, and the motor 239 is energized to rotate the mirror 231 and to move the lens 247. This rotation of the mirror 231 brings the second auxiliary image light distribution back toward correspondence with the light distribution of the first auxiliary image. When the best auxiliary image light distribution correspondence is achieved, a signal in the chip circuitry equivalent to the signal F arrives at a minimum value. The chip circuitry detects the occurrence of this minimum signal value and switches the chip output signal to its said other state. The operation of the motor 239 is then terminated, with the lens 247 in the position of best focus for the new object distance.

Figure 16:
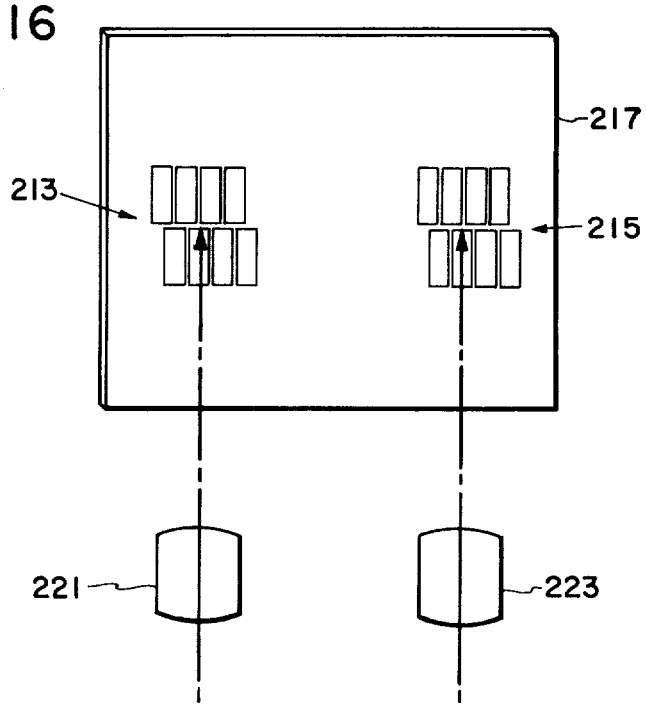
FIG. 16 is a front view of a desirable configuration for the light responsive elements of the FIG. 15 embodiment.

In FIG. 16 there is illustrated, by way of example, a desirable configuration for the light responsive elements of the detector means 213 and 215 on the integrated circuit chip 217 of FIG. 15. FIG. 16 shows each of the detector means 213 and 215 as consisting of eight light responsive elements or areas lying in two slightly vertically displaced horizontal rows along a line or path on the surface of the chip substrate, with the elements of one row of each detector means being staggered with respect to the elements of the other row of that detector means. As in the case of the detector means illustrated in FIGS. 9, 10, and 11, the elements of each of the detector means of FIG. 16 lie very closely together along their path, with the elements forming the detector means 213 lying immediately adjacent and coplanar with the elements forming the detector means 215. FIG. 16 shows the lenses 221 and 223 positioned with respect to the chip 217 so as to produce the auxiliary images on the elements of the corresponding detector means.

The elements making up the detector means 213 and 215, along with the above-noted signal handling circuitry interconnecting those elements, can desirably be formed on the chip 217 using the known large scale integration processes and techniques. Said circuitry includes the necessary amplifiers and connections for connecting the elements of the detector means 213 in pairs with the corresponding elements of the detector means 215 to permit the comparisons of the outputs of the elements of each pair described hereinbefore. This circuitry may well follow that shown in FIG. 14.

If necessary, due to any inability to so fabricate the chip 217 that all of the light responsive element pairs and their associated amplifiers match to the required degree, the chip 217 can be provided with more elements and associated amplifiers than are actually needed. Then the ones of these elements and their amplifiers which provide the best match can be selected and utilized, and the remaining elements and amplifiers left unused.

Figure 17:
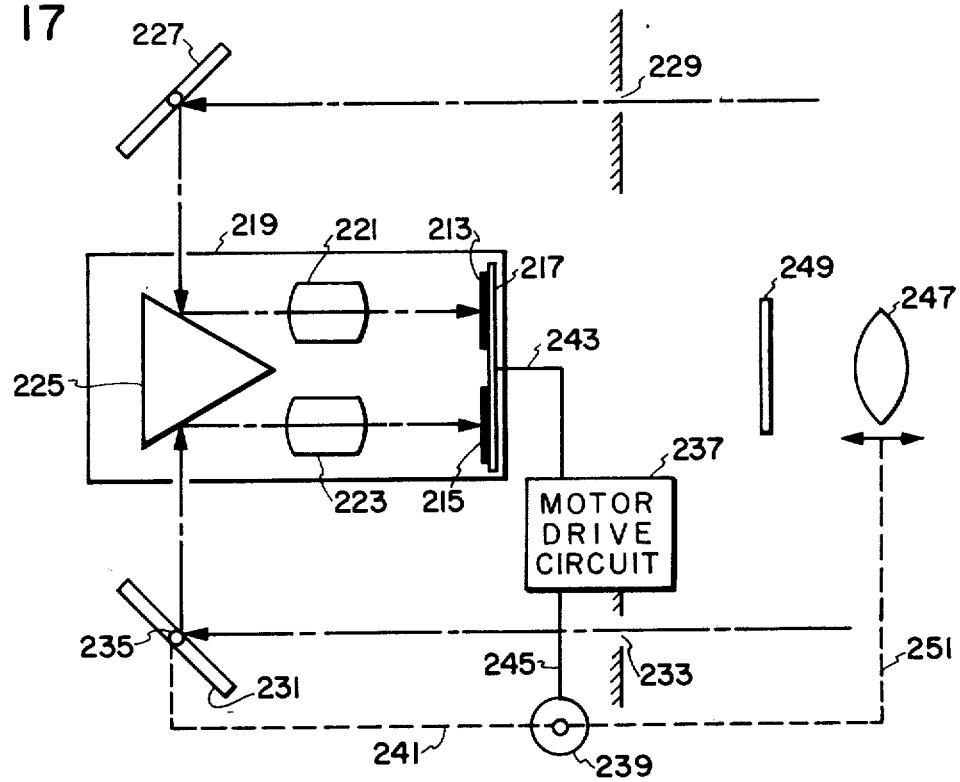
FIGS. 17, 18, 19, and 20 are schematic diagrams of modified forms which the FIG. 15 embodiment may take.

FIG. 17 illustrates a modified form of the embodiment of FIG. 15 wherein the module 219 is turned end-for-end from the position which it occupies in the FIG. 15 embodiment. As is apparent from FIG. 17, this orientation of the module 219 minimizes the required depth of the camera or other device which is to house the focus controlling apparatus.

Figure 18:
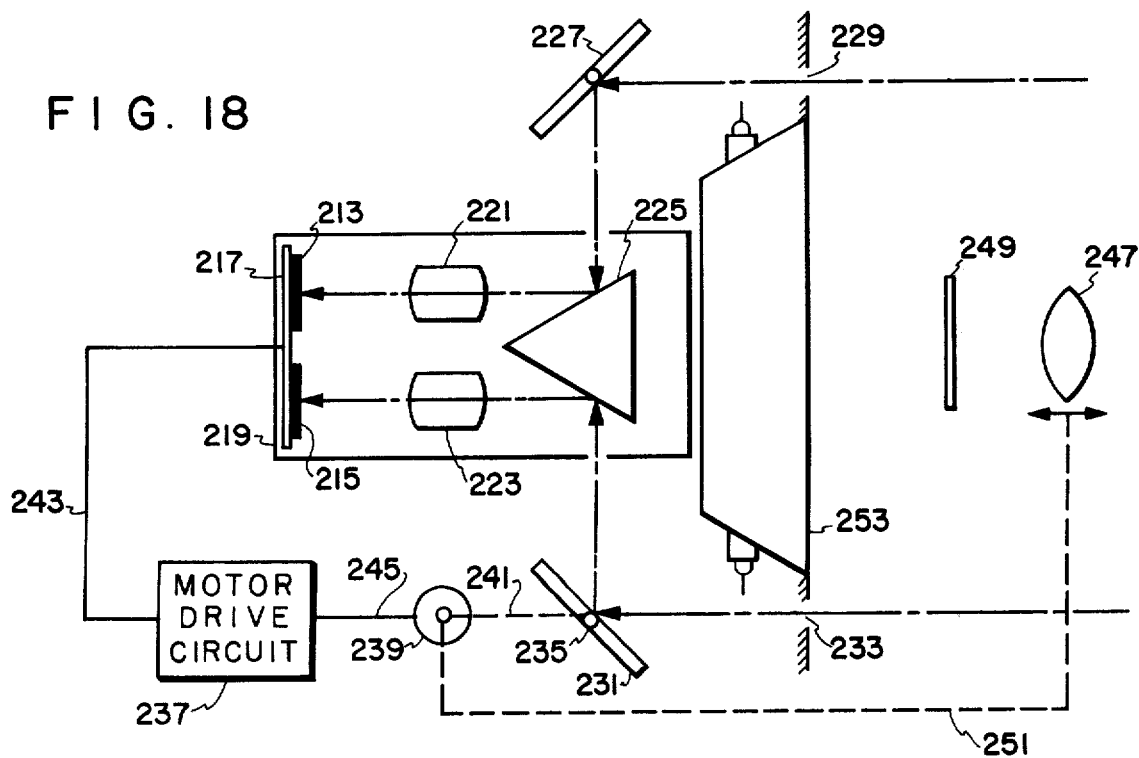

FIG. 18 illustrates another modification of the FIG. 15 embodiment wherein the apertures 229 and 233 flank a reflector 253 which is included in the camera containing the focus controlling apparatus. The reflector 253 forms a part of an electronic flash device which is useful in such a camera. The location of the apertures 229 and 233 at the opposite ends of the reflector 253 gives a desirable amount of separation between the mirrors 227 and 231, using only a minimum additional amount of camera width over that required for the reflector.

Figure 19:
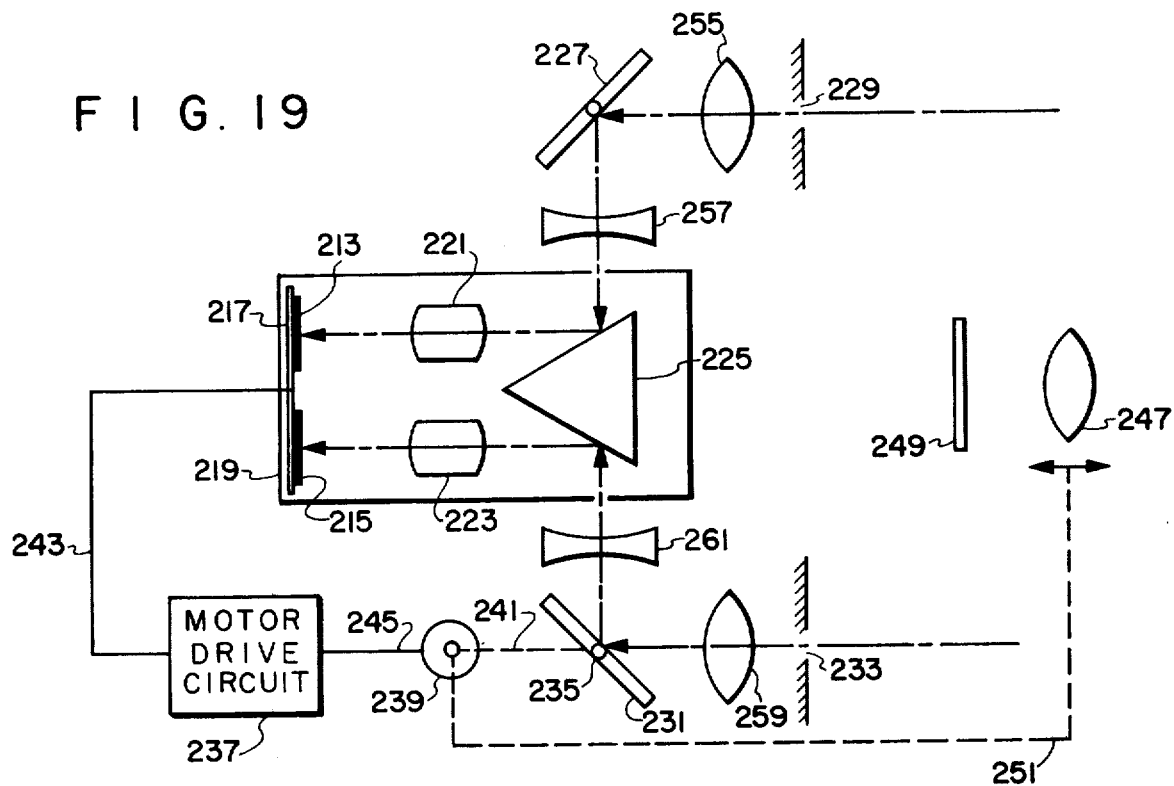

FIG. 19 illustrates still another modification of the FIG. 15 embodiment wherein means are provided for changing the field of view from which the auxiliary images are formed. This means consists of lenses 255 and 257 located in the path of the light which forms the first auxiliary image, and lenses 259 and 261 located in the path of the light which forms the second auxiliary image. More specifically, the lens 255 is located adjacent the aperture 229, while the lens 257 is located adjacent the side of the prism 225 which reflects the light of the first auxiliary image. Similarly, the lens 259 is located adjacent the aperture 233, while the lens 261 is located adjacent the side of the prism 225 which reflects the light of the second auxiliary image. By making the lenses 255 and 259 positive and the lenses 257 and 261 negative, as illustrated, the field of view is decreased. The field of view can be increased by interchanging the positive and negative lenses in sign and power.

Figure 20:
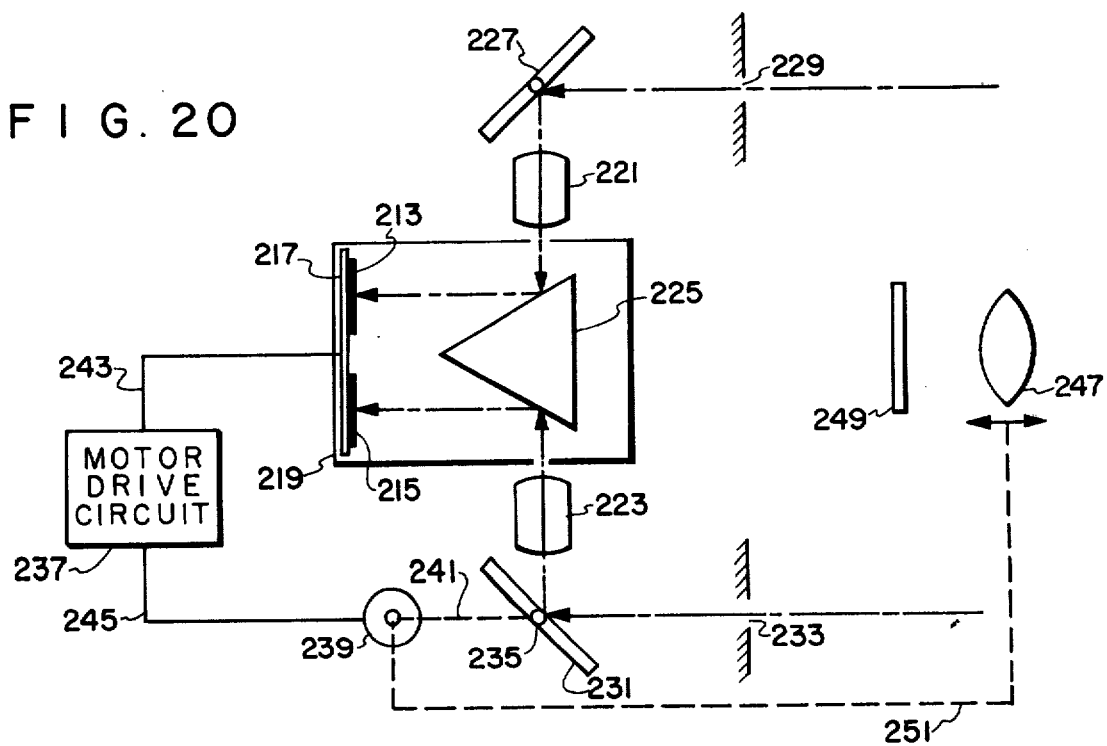

FIG. 20 illustrates yet another modification of the FIG. 15 embodiment wherein the optical positions of the prism 225 and the lenses 221 and 223 are interchanged. Specifically, the lenses 221 and 223 receive the light from the object before it is reflected by the prism 225 to the detector means 213 and 215. This permits the depth of the module 219, and hence the depth of the entire arrangement, to be significantly reduced. It also permits the diameter of the lenses 221 and 223 to be increased, thereby increasing the lower end of the absolute light level range over which the arrangement can be operated satisfactorily.

Figure 21:
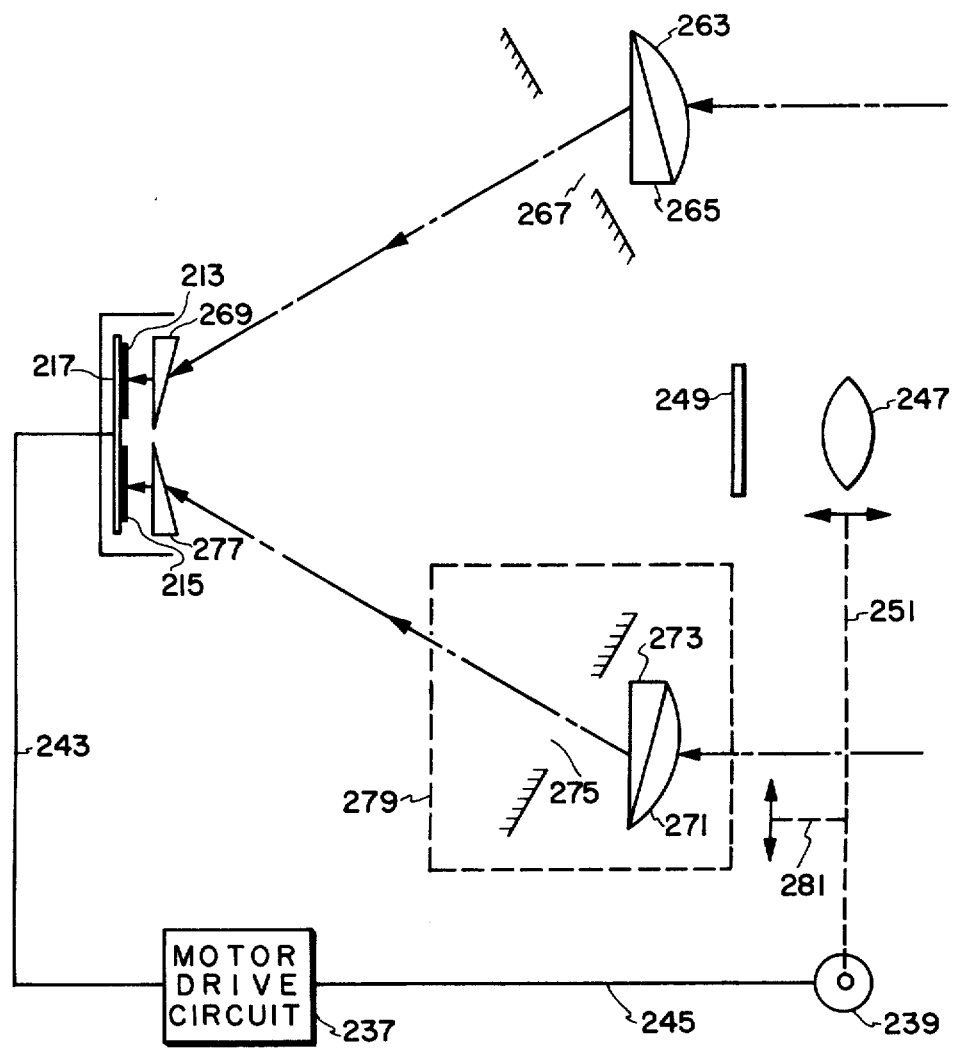
FIG. 21 is a schematic diagram of still another modification to the FIG. 1 embodiment.

FIG. 21 illustrates another modification to the embodiment of FIG. 1 which, like the embodiments of FIGS. 9, 10, 15, and 17 through 20, makes it possible to dispose the first and second detector means very closely together on a single substrate while allowing the auxiliary image producing means to be separated the required amount at the light collecting location. Accordingly, the FIG. 21 arrangement includes the integrated circuit chip 217 which carries the detector means 213 and 215, and which is connected to the motor 239 by the conductors 243 and 245 and the motor drive circuit 237, all as in FIGS. 15 and 17 through 20. Also as in the latter figures, the FIG. 21 arrangement includes the lens 247 which is to be adjusted by the motor 239 through the linkage 251 to focus the image of an object onto the film 249.

The means in FIG. 21 for conducting the first auxiliary image to the detector means 213 include a lens 263, a prism 265, an aperture 267, and a prism 269. Light coming from the object passes along an optical axis or path, shown by the light dashed line, through the lens 263. The axis and light are then bent toward the detector means 213 by the prism 265. The light then passes through the aperture 267, which is so sized and positioned that the detector means 213 views an exit pupil which is symmetrical with respect to the optical axis. The light then passes through the prism 269, which is arranged to cause the light to fall on the detector means 213 along an axis normal to the surface of the detector means. The presence of the aperture 267 and the prism 269 prevent the image on the detector means 213 from experiencing the undesirable extensive vignetting, or gradual shading off at the edges, which the prism 265 would introduce in the absence of the aperture 267 and the prism 269.

The second auxiliary image is conducted to and produced on the detector means 215 in the same manner as that just described for the first image. Thus, the light from the object passes through a lens 271, a prism 273, an aperture 275, and a prism 277 to form the second auxiliary image on the detector means 215. Again, the presence of the aperture 275 and the prism 277 significantly reduces the vignetting of the image which would otherwise be produced.

In the FIG. 21 arrangement, the shifting of the second auxiliary image on the detector means 215 is accomplished by moving the lens 271, the prism 273, and the aperture 275 as a unit. Accordingly, these three elements are shown as being included in an assembly 279 which is moved by the motor 239 in the direction shown, by means of a linkage 281, as the motor 239 moves the lens 247. This moving of the assembly 279 produces the same results as are obtained by moving the lens 29 in the FIG. 1 arrangement, or by rotating the mirror 231 in the arrangements of FIGS. 15 and 17 through 20.

The operation of the FIG. 21 arrangement is the equivalent of that described hereinbefore for the arrangement of FIG. 15. Thus, a change in object distance from one for which the lens 247 is in the position of best focus disturbs the condition of best light distribution correspondence of the auxiliary images on the detector means. This causes the chip 217 output signal to energize the motor 239 until the resulting repositioning of the assembly 279 restores the condition of best light distribution correspondence for the auxiliary images for the new object distance. At that time, the operation of the motor 239 is terminated, with the lens 247 in the position of best focus for the new object distance.

Thus, there has been provided, in accordance with the present invention, a focus detecting apparatus in which the auxiliary images do not require the attainment of exact focus in synchronism with the exact focus of the principal image. The auxiliary lenses of the focus detecting apparatus of the present invention need not be matched to the focal characteristics of the main objective lens, and no complex mechanical linkages need be provided for the proper operation of the present focus detecting apparatus.

The embodiments of the present invention in which an exclusive property or privilege is claimed are defined as follows:

1. Apparatus for providing a measure of the distance between the apparatus and an object, comprising
    a plurality of radiation responsive elements formed on a single planar substrate and divided into two similar coplanar detector arrays lying immediately adjacent each other, all of the elements in each of said arrays being closely spaced along a line thereof, each of said elements being arranged to provide an electrical signal representative of the intensity of radiation impinging thereon,
    first auxiliary means defining a first optical path for radiation from the object and for forming a first detection image thereof on solely one of said arrays,
    second auxiliary means defining a second optical path for radiation from the object and for forming a second detection image thereof on solely the other of said arrays, the positions and radiation distributions of said detection images on the corresponding arrays changing with changes in the distance between the object and said arrays, and with changes in the relative positions of said auxiliary means and said arrays,
    signal processing means connected to said elements for comparing the signal from each of said elements of one of said arrays with the signal from the positionally corresponding one of said elements of the other of said arrays, and for summing the results of such comparisons to provide an output signal which has a minimum value when the radiation distributions of said detection images on the corresponding arrays are substantially identical, and
    control means connected to receive and to be responsive to said output signal for effecting relative movement between at least one of said detection images and the corresponding one of said arrays, along said line of the said elements thereof, to establish a condition in which the radiation distributions of said detection images on the corresponding arrays are substantially identical and said output signal reaches the minimum value therefor, to provide a measure of the distance between the object and said arrays.

2. Apparatus as specified in claim 1, wherein said control means is coupled to at least a portion of said auxiliary means to effect said relative movement between at least one of said detection images and the corresponding one of said arrays by moving said portion relative to the corresponding one of said arrays to a position at which said output signal reaches said minimum value therefor, said position of said portion providing a measure of the distance between the object and said arrays.

3. Apparatus as specified in claim 2, wherein each of said auxiliary means includes a lens means for forming the corresponding one of said detection images on the corresponding one of said arrays, and wherein at least one of said lens means is said portion which is moved by said control means.

4. Apparatus as specified in claim 3, wherein said lines of said elements of said arrays lie in end to end relationship, and wherein said moved lens means is moved along a path parallel to said lines.

5. Apparatus as specified in claim 1, wherein said control means is coupled to said substrate to effect said relative movement between at least one of said detection images and the corresponding one of said arrays by moving said substrate substantially at right angles to the direction of said optical paths to a position at which said output signal reaches said minimum value therefor, said position of said substrate providing a measure of the distance between said object and said arrays, and wherein one of said auxiliary means includes optical means for altering the angle of incidence of the corresponding one of said optical paths with respect to the corresponding one of said arrays.

6. Apparatus as specified in claim 1, wherein said line of the elements of one of said arrays lies parallel to the line of the elements of the other of said arrays, with the elements of each pair of corresponding elements of the two arrays being adjacent each other and displaced along a line extending at right angles to said parallel lines of elements, and wherein each of said optical paths includes light pipe means for forming the corresponding one of said detection images along the line of elements of the corresponding one of said arrays.

7. Apparatus as specified in claim 1, wherein said signal processing means includes means for providing a plurality of absolute value signals, each of which represents the absolute value of the difference between the corresponding two compared ones of said signals from said elements, and wherein said output signal is representative of the sum of said absolute value signals.

8. Apparatus as specified in claim 1, wherein said signal processing means includes means for providing a plurality of square value signals, each of which represents the square of the difference between the corresponding two compared ones of said signals from said elements, and wherein said output signal is representative of the sum of said square value signals.

9. Apparatus as specified in claim 1, wherein said signal processing means includes
    first diode means for providing a first plurality of signals, each of which represents the difference between the corresponding two compared ones of said signals from said elements rectified to one polarity,
    second diode means for providing a second plurality of signals, each of which represents the difference between the corresponding two compared ones of said signals from said elements rectified to the opposite polarity,
    means for producing a summation of said first plurality of signals,
    means for providing a summation of said second plurality of signals,
    means for inverting one of said summations, and means for summing said inverted summation and the other of said summations to form said output signal.

10. Apparatus as specified in claim 1, wherein said signal processing means includes
   means for providing a plurality of comparison signals, each of which represents the difference between the corresponding two compared ones of said signals from said elements,
   means for comparing said comparison signals in sequential pairs to provide a correlated signal representative of each such comparison, and
   means for summing the absolute values of said correlated signals to form said output signal.

11. Automatic focussing apparatus, comprising
   first adjustable means for producing a principal image of an object on a predetermined plane and adjustable to focus said image on said plane,
   a plurality of radiation responsive elements formed on a single planar substrate and divided into two similar coplanar detector arrays lying immediately adjacent each other, all of the elements in each of said arrays being closely spaced along a line thereof, each of said elements being arranged to provide an electrical signal representative of the intensity of radiation impinging thereon,
   first auxiliary means defining a first optical path for radiation from the object and for forming a first detection image thereof on solely one of said arrays,
   second auxiliary means defining a second optical path for radiation from the object and for forming a second detection image thereof on solely the other of said arrays, the positions and radiation distributions of said detection images on the corresponding arrays changing with changes in the distance between the object and said arrays, and with changes in the relative positions of said auxiliary means and said arrays,
   signal processing means connected to said elements for comparing the signal from each of said elements of one of said arrays with the signal from the positionally corresponding one of said elements of the other of said arrays, and for summing the results of such comparisons to provide an output signal which has a minimum value when the radiation distributions of said detection images on the corresponding arrays are substantially identical,
   control means connected to receive and to be responsive to said output signal for effecting relative movement between at least one of said detection images and the corresponding one of said arrays, along said line of the said elements thereof, unless and until the radiation distributions of said detection images on the corresponding arrays are substantially identical and said output signal reaches the minimum value therefor, and
   means coupling said control means to said first adjustable means to cause said control means to adjust said first adjustable means, simultaneously with the effecting of said relative movement, to make said principal image to be in optimum focus on said predetermined plane whenever the radiation distributions of said detection images on the corresponding arrays are substantially identical.

12. Apparatus as specified in claim 11, wherein said control means is coupled to at least a portion of said auxiliary means to effect said relative movement between at least one of said detection images and the corresponding one of said arrays by moving said portion relative to the corresponding one of said arrays to a position at which said output signal reaches said minimum value therefor, said position of said portion providing a measure of the distance between the object and said arrays.

13. Apparatus as specified in claim 12, wherein each of said auxiliary means includes a lens means for forming the corresponding one of said detection images on the corresponding one of said arrays, and wherein at least one of said lens means is said portion which is moved by said control means.

14. Apparatus as specified in claim 13, wherein said lines of said elements of said arrays lie in end to end relationship, and wherein said moved lens means is moved along a path parallel to said lines.

15. Apparatus as specified in claim 11, wherein said control means is coupled to said substrate to effect said relative movement between at least one of said detection images and the corresponding one of said arrays by moving said substrate substantially at right angles to the direction of said optical paths to a position at which said output signal reaches said minimum value therefor, said position of said substrate providing a measure of the distance between said object and said arrays, and wherein one of said auxiliary means includes optical means for altering the angle of incidence of the corresponding one of said optical paths with respect to the corresponding one of said arrays.

16. Apparatus as specified in claim 11, wherein said line of the elements of one of said arrays lies parallel to the line of the elements of the other of said arrays, with the elements of each pair of corresponding elements of the two arrays being adjacent each other and displaced along a line extending at right angles to said parallel lines of elements, and wherein each of said optical paths includes light pipe means for forming the corresponding one of said detection images along the line of elements of the corresponding one of said arrays.

17. Apparatus as specified in claim 11, wherein said signal processing means includes means for providing a plurality of absolute value signals, each of which represents the absolute value of the difference between the corresponding two compared ones of said signals from said elements, and wherein said output signal is representative of the sum of said absolute value signals.

18. Apparatus as specified in claim 11, wherein said signal processing means includes means for providing a plurality of square value signals, each of which represents the square of the difference between the corresponding two compared ones of said signals from said elements, and wherein said output signal is representative of the sum of said square value signals.

19. Apparatus as specified in claim 11, wherein said signal processing means includes
   first diode means for providing a first plurality of signals, each of which represents the difference between the corresponding two compared ones of said signals from said elements rectified to one polarity,
   second diode means for providing a second plurality of signals, each of which represents the difference between the corresponding two compared ones of said signals from said elements rectified to the opposite polarity,
   means for producing a summation of said first plurality of signals, means for providing a summation of said second plurality of signals, means for inverting one of said summations, and means for summing said inverted summation and the other of said summations to form said output signal.

20. Apparatus as specified in claim 11, wherein said signal processing means includes means for providing a plurality of comparison signals, each of which represents the difference between the corresponding two compared ones of said signals from said elements, means for comparing said comparison signals in sequential pairs to provide a correlated signal representative of each such comparison, and means for summing the absolute values of said correlated signals to form said output signal.

21. Apparatus for providing a measure of the distance between the apparatus and an object, comprising a plurality of radiation responsive elements divided into two similar detector arrays, with the elements of each of said arrays lying along a line thereof, each of said elements being arranged to provide an electrical signal representative of the intensity of radiation impinging thereon, first auxiliary means defining a first optical path for radiation from the object and for forming a first detection image thereof on solely one of said arrays, second auxiliary means defining a second optical path for radiation from the object and for forming a second detection image thereof on solely the other of said arrays, the positions and radiation distributions of said detection images on the corresponding arrays changing with changes in the distance between the object and said arrays, and with changes in the relative positions of said auxiliary means and said arrays, signal processing means connected to said elements for comparing the signal from each of said elements of one of said arrays with the signal from the positionally corresponding one of said elements of the other of said arrays, and for summing the results of such comparisons to provide an output signal which has a minimum value when the radiation distributions of said detection images on the corresponding arrays are substantially identical, control means for effecting relative movement between at least one of said detection images and the corresponding one of said arrays, along said line of the elements thereof, to bring the radiation distributions of said detection images toward a condition of best correspondence on said arrays, thereby to decrease the value of said output signal toward said minimum value, the value of said output signal tending to dip to minor minima as it is reduced toward said minimum value, valley detecting means connected to respond to the value of said output signal and connected to said control means to permit said relative movement while said value of said output signal is decreasing, and to terminate said relative movement when the value of said output signal stops decreasing and starts to increase, and limiting means connected to said signal processing means to prevent the value of said output signal from exceeding an upper limit lying between the lowest of said minor minima and said minimum value, thereby to cause said relative movement to be terminated only when the value of said output signal reaches said minimum value, and to establish a condition in which the radiation distributions of said detection images on the corresponding arrays are substantially identical, to provide a measure of the distance between the object and said arrays.

22. Apparatus as specified in claim 21, wherein said limiting means includes a biased diode connected to clamp the upper limit of the value of said output signal.

23. Apparatus for providing a measure of the distance between the apparatus and an object, comprising a plurality of radiation responsive elements divided into two similar detector arrays, with the elements of each of said arrays lying along a line thereof, each of said elements being arranged to provide an electrical signal representative of the intensity of radiation impinging thereon, first auxiliary means defining a first optical path for radiation from the object and for forming a first detection image thereof on solely one of said arrays, second auxiliary means defining a second optical path for radiation from the object and for forming a second detection image thereof on solely the other of said arrays, the positions and radiation distributions of said detection images on the corresponding arrays changing with changes in the distance between the object and said arrays, and with changes in the relative positions of said auxiliary means and said arrays, signal processing means connected to said elements and including first means for deriving a log signal for each of said elements which represents the log of the intensity of radiation impinging on that element, second means for receiving and comparing the log signal for each of said elements of one of said arrays with the log signal for the positionally corresponding one of said elements of the other of said arrays, and third means for summing the results of such comparisons to provide an output signal which has a minimum value when the radiation distributions of said detection images on the corresponding arrays are substantially identical, and control means connected to receive and to be responsive to said output signal for effecting relative movement between at least one of said detection images and the corresponding one of said arrays, along said line of the said elements thereof, to establish a condition in which the radiation distributions of said detection images on the corresponding arrays are substantially identical and said output signal reaches the minimum value therefor, to provide a measure of the distance between the object and said arrays.

24. Apparatus as specified in claim 23, wherein said first means includes a separate diode connected to each of said elements, and wherein each of said log signals is the signal produced across the corresponding one of said diodes as a result of the signal provided by the corresponding one of said elements.

25. Apparatus as specified in claim 23, wherein each of said elements is a photodiode, wherein said first means includes a separate diode connected across each of said photodiodes, and wherein each of said log signals is the signal produced across the corresponding one of said diodes as a result of the signal provided by the corresponding one of said elements.

26. Apparatus for providing a measure of the distance between the apparatus and an object, comprising
- a plurality of radiation responsive elements divided into two similar, closely spaced detector arrays, with the elements of each of said arrays lying along a line thereof, each of said elements being arranged to provide an electrical signal representative of the intensity of radiation impinging thereon.
- first auxiliary means defining a first optical path for radiation from the object and for forming a first detection image thereof on solely one of said arrays,
- second auxiliary means defining a second optical path for radiation from the object and for forming a second detection image thereof on solely the other of said arrays, the positions and radiation distributions of said detection images on the corresponding arrays changing with changes in the distance between the object and said arrays, and with changes in the relative positions of said auxiliary means and said arrays,
- each of said auxiliary means including along the corresponding optical path a lens for receiving radiation from the object, a first prism for directing the last mentioned radiation towards a corresponding one of said arrays, an aperture to pass said last mentioned radiation and to cause said corresponding array to view an exit pupil which is symmetrical with respect to said corresponding optical path, and a second prism to cause said last mentioned radiation to impinge on said corresponding array along a portion of said corresponding optical path which is substantially normal to the surface of said corresponding array, the spacing between said lenses of said first and second auxiliary means being significantly greater than the spacing between said arrays,
- signal processing means connected to said elements for comparing the signal from each of said elements of one of said arrays with the signal from the positionally corresponding one of said elements of the other of said arrays, and for summing the results of such comparisons to provide an output signal which has a minimum value when the radiation distributions of said detection images on the corresponding arrays are substantially identical, and
- control means connected to receive and to be responsive to said output signal for effecting relative movement between at least one of said detection images and the corresponding one of said arrays, along said line of the said elements thereof, to establish a condition in which the radiation distributions of said detection images on the corresponding arrays are substantially identical and said output signal reaches the minimum value therefor, to provide a measure of the distance between the object and said arrays.

27. Apparatus as specified in claim 26, wherein said control means is coupled to move said lens, said first prism, and said aperture of one of said auxiliary means as a unit to effect said relative movement.

28. An arrangement for use in apparatus for providing a measure of the distance between the apparatus and an object, comprising
- a plurality of radiation responsive elements formed on a single planar substrate and divided into two similar coplanar detector arrays lying immediately adjacent each other, all of the elements in each of said arrays being closely spaced along a line thereof, each of said elements being arranged to provide an electrical signal representative of the intensity of radiation impinging thereon,
- first auxiliary means providing a first optical path for radiation from the object and for forming a first detection image thereof on solely one of said arrays,
- second auxiliary means providing a second optical path for radiation from the object and for forming a second detection image thereof on solely the other of said arrays, the positions and radiation distributions of said detection images on the corresponding arrays changing with changes in the distance between the object and said arrays, and
- signal processing means connected to said elements for comparing the signal from each of said elements of one of said arrays with the signal from the positionally corresponding one of said elements of the other of said arrays, and for summing the results of such comparisons to provide an output signal which has a minimum value when the radiation distributions of said detection images on the corresponding arrays are substantially identical.

29. An arrangement for use in apparatus for providing a measure of the distance between the apparatus and an object, comprising
- a plurality of radiation responsive elements divided into two similar detector arrays, each of said elements being arranged to provide an electrical signal representative of the intensity of radiation impinging thereon.
- first auxiliary means providing a first optical path for radiation from the object and for forming a first detection image thereof on solely one of said arrays,
- second auxiliary means providing a second optical path for radiation from the object and for forming a second detection image thereof on solely the other of said arrays, the positions and radiation distributions of said detection images on the corresponding arrays changing with changes in the distance between the object and said arrays,
- signal processing means connected to said elements for comparing the signal from each of said elements of one of said arrays with the signal from the positionally corresponding one of said elements of the other of said arrays, and for summing the results of such comparisons to provide an output signal which has a minimum value when the radiation distributions of said detection images on the corresponding arrays are substantially identical, and which tends to exhibit minor minima as this condition of substantial identity is approached,
- valley detecting means connected to respond to the value of said output signal and to produce a change in a control signal when the value of said output signal reaches a minimum, and
- limiting means connected to said signal processing means to prevent the value of said output signal from exceeding an upper limit lying between the lowest of said minor minima and said minimum value, thereby to prevent the production of said control signal change by said minor minima in the value of said output signal.

30. An arrangement as specified in claim 29, wherein said limiting means includes a biased diode connected to clamp the upper limit of the value of said output signal.

31. An arrangement for use in apparatus for providing a measure of the distance between the apparatus and an object, comprising
a plurality of radiation responsive elements divided into two similar detector arrays, each of said elements being arranged to provide an electrical signal representative of the intensity of radiation impinging thereon,
first auxiliary means providing a first optical path for radiation from the object and for forming a first detection image thereof on solely one of said arrays,
second auxiliary means providing a second optical path for radiation from the object and for forming a second detection image thereof on solely the other of said arrays, the positions and radiation distributions of said detection images on the corresponding arrays changing with changes in the distance between the object of said arrays, and
signal processing means connected to said elements and including first means for deriving a log signal for each of said elements which represents the log of the intensity of radiation impinging on that element, second means for receiving and comparing the log signal for each of said elements of one of said arrays with the log signal for the positionally corresponding one of said elements of the other of said arrays, and third means for summing the results of such comparisons to provide an output signal which has a minimum value when the radiation distributions of said detection images on the corresponding arrays are substantially identical.

32. An arrangement as specified in claim 31, wherein said first means includes a separate diode connected to each of said elements, and wherein each of said log signals is the signal produced across the corresponding one of said diodes as a result of the signal provided by the corresponding one of said elements.

33. An arrangement as specified in claim 31, wherein each of said elements is a photodiode, wherein said first means includes a separate diode connected across each of said photodiodes, and wherein each of said log signals is the signal produced across the corresponding one of said diodes as a result of the signal provided by the corresponding one of said photodiodes.

34. An arrangement for use in apparatus for providing a measure of the distance between the apparatus and an object, comprising
a plurality of radiation responsive elements formed on a single planar substrate and divided into two similar coplanar detector arrays lying immediately adjacent each other, all of the elements in each of said arrays being closely spaced along a line thereof, each of said elements being arranged to provide an electrical signal representative of the intensity of radiation impinging thereon,
signal processing means formed on said substrate and connected to said elements for comparing the signal from each of said elements of one of said arrays with the signal from the positionally corresponding one of said elements of the other of said arrays, and for summing the results of such comparisons to provide an output signal,
housing means supporting said substrate,
first optical means supported within said housing means to conduct radiation from the object to solely one of said arrays to form on the latter a first detection image of the object, and
second optical means supported within said housing means to conduct radiation from the object to solely the other of said arrays to form on the latter a second detection image of the object, the positions and radiation distributions of said detection images on the corresponding arrays changing with changes in the distance between the object and said arrays, and said output signal having a minimum value when the radiation distributions of said detection images on the corresponding arrays are substantially identical.

35. An arrangement as specified in claim 34, wherein said substrate is that of an integrated circuit chip.

36. Apparatus for providing a measure of the distance between the apparatus and an object, comprising
a plurality of radiation responsive elements which are portions of an integrated circuit chip and are in two detector arrays, each of said elements providing a signal representative of the intensity of radiation impinging thereon,
first auxiliary means defining a first optical path for radiation from the object and for forming a first detection image thereof on one of said arrays,
second auxiliary means defining a second optical path for radiation from the object and for forming a second detection image thereof on the other of said arrays, the radiation distributions of said detection images changing with changes in the distance between the object and said arrays, and with changes in the relative positions of either of said first and second auxiliary means and said arrays,
signal processing means connected to said elements for comparing the signal from each of said elements of one of said arrays with the signal from a positionally corresponding one of said elements of the other of said arrays, and for using the results of such comparisons to provide an output signal which has a predetermined characteristic when the radiation distributions of said detection images on the corresponding arrays are substantially identical, and
control means connected to receive and to be responsive to said output signal for effecting relative movement between at least one of said detection images and the corresponding one of said arrays to establish a condition in which the radiation distributions of said detection images on the corresponding arrays are substantially identical and said output signal is proximate said characteristic, to provide a measure of the distance between the object and said apparatus.

37. Apparatus as specified in claim 36, wherein at least the portion of said signal processing means which is connected to said elements is formed as a portion of said integrated circuit chip to minimize the introduction of noise signals into said signal processing means.

38. An arrangement for use in appartus for providing a measure of the distance between the apparatus and an object, comprising
a plurality of radiation responsive elements which are portions of an integrated circuit chip and are in two detector arrays, each of said elements providing a signal representative of the intensity of radiation impinging thereon, first auxiliary means providing a first optical path for radiation from the object and for forming a first detection image thereof on one of said arrays, second auxiliary means providing a second optical path for radiation from the object and for forming a second detection image thereof on the other of said arrays, the radiation distributions of said detection images changing with changes in the distance between the object and said arrays, and signal processing means connected to said elements for comparing the signal from each of said elements of one of said arrays with the signal from a positionally corresponding one of said elements of the other of said arrays, and for using the results of such comparisons to provide an output signal which has a predetermined characteristic when the radiation distributions of said detection images on the corresponding arrays are substantially identical.

39. Apparatus as specified in claim 38, wherein at least the portion of said signal processing means which is connected to said elements is formed as a portion of said integrated circuit chip to minimize the introduction of noise signals into said signal processing means.

40. An arrangement for use in apparatus for providing a measure of the distance between the apparatus and an object, comprising a plurality of radiation responsive elements which are portions of an integrated circuit chip and are in two detector arrays, each of said elements providing a signal representative of the intensity of radiation impinging thereon, signal processing means connected to receive signals from said elements for comparing the signal from each of said elements of one of said arrays with the signal from a positionally corresponding one of said elements of the other of said arrays, and for using the results of such comparisons to provide an output signal, at least the portion of said signal processing means which is connected to receive said signals being formed as a portion of said integrated circuit chip to minimize the introduction of noise signals into said signal processing means, housing means supporting said integrated circuit chip, first optical means having at least a portion supported within said housing means to conduct radiation from the object to one of said arrays to form on the latter a first detection image of the object, and second optical means having at least a portion supported within said housing means to conduct radiation from the object to the other of said arrays to form on the latter a second detection image of the object, the radiation distributions of said detection images changing with changes in the distance between the object and said arrays, and said output signal having a predetermined characteristic when the radiation distributions of said detection images on the corresponding arrays are substantially identical.

41. Apparatus of the class described comprising, in combination:

first and second light sensing means each operable to produce an output signal which varies with the intensity of light impinging upon a light receiving surface thereof, said light receiving surfaces being portions of a monolithic integrated circuit chip;

light directing means to direct light from first and second fields of view to the light receiving surfaces of the first and second light sensing means respectively;

signal processing means receiving the output signals from the first and second light sensing means and producing a resultant signal which has a characteristic when the light from the first and second fields of view is substantially the same; and means connected to receive said resultant signal and operable to change at least one of the fields of view until the resultant signal is proximate the characteristic.

42. Apparatus in accordance with claim 41, wherein the characteristic of said resultant signal is a minimum value and wherein said resultant signal has other minor minima therein; and means connected to said signal processing means to provide a further signal from the resultant signal which further signal does not exceed the level which is below the lowest of the minor minima.

43. Apparatus in accordance with claim 41, wherein the resultant signal varies with the ratio of the output signals from the first and second light sensing means.

44. Apparatus in accordance with claim 43, in which the ratio is obtained by obtaining the logarithms of the output signals of the first and second light sensing means and subtracting them.

* * * * *